(12) United States Patent
Braun et al.

(10) Patent No.: US 10,428,255 B2
(45) Date of Patent: Oct. 1, 2019

(54) SHAPED ABRASIVE PARTICLE AND METHOD OF FORMING SAME

(71) Applicant: Saint-Gobain Ceramics & Plastics, Inc., Worcester, MA (US)

(72) Inventors: Paul Braun, Providence, RI (US); Doruk O. Yener, Bedford, MA (US); Jennifer H. Czerepinski, Framingham, MA (US); Ralph Bauer, Niagara Falls (CA); Krishnamoorthy Subramanian, Lexington, MA (US); Robin M. Bright, Charlton, MA (US); Anuj Seth, Northborough, MA (US); Gregory G. Lafond, Boylston, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 15/278,968

(22) Filed: Sep. 28, 2016

(65) Prior Publication Data
US 2017/0015886 A1    Jan. 19, 2017

Related U.S. Application Data

(63) Continuation of application No. 14/335,323, filed on Jul. 18, 2014, now Pat. No. 9,765,249, which is a
(Continued)

(51) Int. Cl.
*C09K 3/14*     (2006.01)
*B01J 2/22*     (2006.01)
(Continued)

(52) U.S. Cl.
CPC ............... *C09K 3/1409* (2013.01); *B01J 2/22* (2013.01); *B01J 2/26* (2013.01); *C09C 1/24* (2013.01);
(Continued)

(58) Field of Classification Search
None
See application file for complete search history.

(56) References Cited

U.S. PATENT DOCUMENTS

| | | |
|---|---|---|
| 345,604 A | 7/1886 | Semper |
| 1,910,444 A | 5/1933 | Nicholson |

(Continued)

FOREIGN PATENT DOCUMENTS

| | | |
|---|---|---|
| CA | 743715 A | 10/1966 |
| CA | 2423788 A1 | 7/2002 |

(Continued)

OTHER PUBLICATIONS

"Investigation of Shaped Abrasive Particles vol. 1: Review of U.S. Pat. No. 6,054,093 Apr. 25, 2000" © Apr. 2011, 5 pages.
(Continued)

*Primary Examiner* — Colleen P Dunn
*Assistant Examiner* — Ross J Christie
(74) *Attorney, Agent, or Firm* — Abel Schillinger, LLP; Adam Keser

(57) ABSTRACT

A method of forming a mixture including a ceramic material into a sheet, sectioning at least a portion of the sheet using a mechanical object and forming at least one shaped abrasive particle from the sheet, such that the at least one shaped abrasive particle can have a two-dimensional shape as viewed in a plane defined by a length and a width of the shaped abrasive particle selected from the group consisting of polygons, ellipsoids, numerals, Greek alphabet characters, Latin alphabet characters, Russian alphabet characters, complex shapes having a combination of polygonal shapes, and a combination thereof.

18 Claims, 16 Drawing Sheets

Related U.S. Application Data continuation of application No. 13/731,810, filed on Dec. 31, 2012, now Pat. No. 8,840,695.

(60) Provisional application No. 61/581,800, filed on Dec. 30, 2011.

(51) Int. Cl.
　　*C09C 1/24* (2006.01)
　　*B01J 2/26* (2006.01)
　　*C09C 1/40* (2006.01)

(52) U.S. Cl.
　　CPC ............ *C09C 1/407* (2013.01); *C09K 3/1427* (2013.01); *C09K 3/1436* (2013.01); *C01P 2004/39* (2013.01)

(56) References Cited

U.S. PATENT DOCUMENTS

| | | |
|---|---|---|
| 2,036,903 A | 4/1936 | Webster |
| 2,049,874 A | 8/1936 | Sherk |
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,563,650 A | 8/1951 | Heinemann et al. |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 7/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Wilkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |

(56) References Cited

U.S. PATENT DOCUMENTS

| | | |
|---|---|---|
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,314,513 A | 5/1994 | Miller et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,489,318 A | 2/1996 | Erickson et al. |
| 5,496,386 A | 3/1996 | Broberg et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,549,962 A | 8/1996 | Holmes et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A | 2/1997 | Zeiringer et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,942,015 A | 8/1999 | Culler et al. |
| 5,946,991 A | 9/1999 | Hoopman |
| 5,975,987 A | 11/1999 | Hoopman et al. |
| 5,975,988 A | 11/1999 | Christianson |
| 5,980,678 A | 11/1999 | Tselesin |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |

(56) References Cited

U.S. PATENT DOCUMENTS

| | | |
|---|---|---|
| 6,331,343 B1 | 12/2001 | Perez et al. |
| 6,371,842 B1 | 4/2002 | Romero |
| 6,391,812 B1 | 5/2002 | Araki et al. |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,451,076 B1 | 9/2002 | Nevoret et al. |
| 6,475,253 B2 | 11/2002 | Culler et al. |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,755,729 B2 | 6/2004 | Ramanath et al. |
| 6,821,196 B2 | 11/2004 | Oliver |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,951,504 B2 | 10/2005 | Adefris et al. |
| 6,974,930 B2 | 12/2005 | Jense |
| 7,022,179 B1 | 4/2006 | Dry |
| 7,044,989 B2 | 5/2006 | Welygan et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,488,544 B2 | 2/2009 | Schofalvi et al. |
| 7,491,251 B2 | 2/2009 | Welygan et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,628,597 B2 | 1/2014 | Palmgren et al. |
| 8,783,589 B2 | 7/2014 | Hart et al. |
| 8,852,643 B2 | 10/2014 | Gonzales et al. |
| 9,017,439 B2 | 4/2015 | Yener et al. |
| 2001/0027623 A1 | 10/2001 | Rosenflanz |
| 2002/0026752 A1 | 3/2002 | Culler et al. |
| 2002/0068518 A1 | 6/2002 | Cesena et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0148868 A1 | 8/2004 | Anderson et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0233845 A1 | 9/2008 | Annen et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017736 A1 | 1/2009 | Block et al. |
| 2009/0165394 A1 | 7/2009 | Culler et al. |
| 2009/0165661 A1 | 7/2009 | Koenig et al. |
| 2009/0169816 A1 | 7/2009 | Erickson et al. |
| 2009/0208734 A1 | 8/2009 | Macfie et al. |
| 2009/0215366 A1 | 8/2009 | Ishizuka |
| 2009/0246464 A1 | 10/2009 | Watanabe et al. |
| 2010/0000159 A1 | 1/2010 | Walia et al. |

(56) References Cited

U.S. PATENT DOCUMENTS

| | | |
|---|---|---|
| 2010/0003900 A1 | 1/2010 | Sakaguchi et al. |
| 2010/0003904 A1 | 1/2010 | Duescher |
| 2010/0040767 A1 | 2/2010 | Uibel et al. |
| 2010/0056816 A1 | 3/2010 | Wallin et al. |
| 2010/0064594 A1* | 3/2010 | Pakalapati .......... C04B 35/5831 51/308 |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0251625 A1 | 10/2010 | Gaeta |
| 2010/0292428 A1 | 11/2010 | Meador et al. |
| 2010/0307067 A1 | 12/2010 | Sigalas et al. |
| 2010/0319269 A1 | 12/2010 | Erickson |
| 2011/0008604 A1 | 1/2011 | Boylan |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0034847 A1 | 2/2012 | Besse et al. |
| 2012/0055098 A1 | 3/2012 | Ramanath et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2012/0308837 A1 | 12/2012 | Schlechtriemen et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0040537 A1 | 2/2013 | Schwabel et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0203328 A1 | 8/2013 | Givot et al. |
| 2013/0212952 A1 | 8/2013 | Welygan et al. |
| 2013/0236725 A1 | 9/2013 | Yener et al. |
| 2013/0255162 A1 | 10/2013 | Welygan et al. |
| 2013/0267150 A1 | 10/2013 | Seider et al. |
| 2013/0283705 A1 | 10/2013 | Fischer et al. |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2013/0344786 A1 | 12/2013 | Keipert |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0290147 A1 | 10/2014 | Seth et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0218430 A1 | 8/2015 | Yener et al. |
| 2015/0232727 A1 | 8/2015 | Erickson |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapare et al. |
| 2016/0214903 A1 | 7/2016 | Humpal et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0326416 A1 | 11/2016 | Bauer et al. |
| 2016/0340564 A1 | 11/2016 | Louapre et al. |
| 2016/0354898 A1 | 12/2016 | Nienaber et al. |
| 2016/0362589 A1 | 12/2016 | Bauer et al. |
| 2017/0066099 A1 | 3/2017 | Nakamura |
| 2017/0114260 A1 | 4/2017 | Bock et al. |
| 2017/0129075 A1 | 5/2017 | Thurber et al. |
| 2018/0086957 A1 | 3/2018 | Sahlin et al. |

FOREIGN PATENT DOCUMENTS

| | | |
|---|---|---|
| CH | 685051 A5 | 3/1995 |
| CN | 102123837 B | 7/2014 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0101518 | 2/1984 |
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B3 | 7/2001 |
| EP | 0833803 | 8/2001 |
| EP | 1356152 A2 | 10/2003 |
| EP | 1371451 A1 | 12/2003 |
| EP | 1383631 B1 | 1/2004 |
| EP | 1015181 B1 | 3/2004 |
| EP | 1492845 A1 | 1/2005 |

(56) References Cited

FOREIGN PATENT DOCUMENTS

| | | |
|---|---|---|
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2390056 A2 | 11/2011 |
| EP | 1800801 B1 | 3/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2720676 A1 | 4/2014 |
| EP | 2012972 B1 | 6/2014 |
| FR | 2354373 A1 | 1/1978 |
| GB | 986847 A | 3/1965 |
| GB | 1466054 | 3/1977 |
| JP | 53064890 A | 6/1978 |
| JP | 60-006356 U | 1/1985 |
| JP | 62002946 B | 1/1987 |
| JP | 63036905 B | 7/1988 |
| JP | 3079277 A | 4/1991 |
| JP | 03-287687 | 12/1991 |
| JP | 5285833 A | 11/1993 |
| JP | 6114739 A | 4/1994 |
| JP | 7008474 B2 | 2/1995 |
| JP | 10113875 A | 5/1998 |
| JP | H10-506579 A | 6/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 2000354967 A | 12/2000 |
| JP | 3160084 B2 | 4/2001 |
| JP | 2001162541 A | 6/2001 |
| JP | 03194269 B2 | 7/2001 |
| JP | 2001207160 A | 7/2001 |
| JP | 2001516652 A | 10/2001 |
| JP | 2002-038131 A | 2/2002 |
| JP | 2002210659 A | 7/2002 |
| JP | 2003-049158 A | 2/2003 |
| JP | 2004-510873 A | 4/2004 |
| JP | 2004209624 A | 7/2004 |
| JP | 2006159402 A | 6/2006 |
| JP | 2006-192540 A | 7/2006 |
| JP | 2008194761 A | 8/2008 |
| JP | 2011507718 A | 3/2011 |
| JP | 5238725 B2 | 7/2013 |
| JP | 5238726 B2 | 7/2013 |
| JP | 2014503367 A | 2/2014 |
| KR | 10-2008-0037693 A | 4/2008 |
| KR | 10-2011-0100278 A | 9/2011 |
| NL | 171464 B | 11/1982 |
| WO | 1994002559 A1 | 2/1994 |
| WO | 95/03370 | 2/1995 |
| WO | 95/18192 A1 | 7/1995 |
| WO | 1995020469 A1 | 8/1995 |
| WO | 96/27189 A1 | 9/1996 |
| WO | 1997014536 A1 | 4/1997 |
| WO | 1999006500 A1 | 2/1999 |
| WO | 99/38817 A1 | 8/1999 |
| WO | 1999038817 A1 | 8/1999 |
| WO | 9954424 A1 | 10/1999 |
| WO | 01/14494 A1 | 3/2001 |
| WO | 2002097150 | 12/2002 |
| WO | 03/087236 A1 | 10/2003 |
| WO | 2005/080624 A1 | 9/2005 |
| WO | 2006/027593 | 3/2006 |
| WO | 2007/041538 A1 | 4/2007 |
| WO | 2009085578 A2 | 7/2009 |
| WO | 2010/077509 A1 | 7/2010 |
| WO | 2010085587 A1 | 7/2010 |
| WO | 2010/151201 | 12/2010 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013/045251 A1 | 4/2013 |
| WO | 2013/049239 A1 | 4/2013 |
| WO | 2013070576 A2 | 5/2013 |
| WO | 2013/101575 A1 | 7/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/151745 A1 | 10/2013 |
| WO | 2013/177446 A1 | 11/2013 |
| WO | 2013/186146 A1 | 12/2013 |
| WO | 2013/188038 A1 | 12/2013 |
| WO | 2014/005120 A1 | 1/2014 |
| WO | 2014/161001 A1 | 2/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/057273 A1 | 4/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/048768 A9 | 6/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/102992 A1 | 7/2015 |
| WO | 2015/112379 A1 | 7/2015 |
| WO | 2015/130487 A1 | 9/2015 |
| WO | 2015/158009 A1 | 10/2015 |
| WO | 2015/160854 A1 | 10/2015 |
| WO | 2015/160855 A1 | 10/2015 |

(56) References Cited

FOREIGN PATENT DOCUMENTS

| | | |
|---|---|---|
| WO | 2015/160857 A1 | 10/2015 |
| WO | 2015/164211 A1 | 10/2015 |
| WO | 2015/165122 A1 | 11/2015 |
| WO | 2015/167910 A1 | 11/2015 |
| WO | 2015/179335 A1 | 11/2015 |
| WO | 2015/180005 A1 | 12/2015 |
| WO | 2015/184355 A1 | 12/2015 |
| WO | 2016/028683 A1 | 2/2016 |
| WO | 2016/044158 A1 | 3/2016 |
| WO | 2016/064726 A1 | 4/2016 |
| WO | 2016/089675 A1 | 6/2016 |
| WO | 2016/105469 A1 | 6/2016 |
| WO | 2016/105474 A1 | 6/2016 |
| WO | 2016/160357 A1 | 10/2016 |
| WO | 2016/161157 A1 | 10/2016 |
| WO | 2016/161170 A1 | 10/2016 |
| WO | 2016/167967 A1 | 10/2016 |
| WO | 2016/187570 A1 | 11/2016 |
| WO | 2016/196795 A1 | 12/2016 |
| WO | 2016/201104 A1 | 12/2016 |
| WO | 2016/205133 A1 | 12/2016 |
| WO | 2016/205267 A1 | 12/2016 |
| WO | 2016/210057 A1 | 12/2016 |
| WO | 2017/007703 A1 | 1/2017 |
| WO | 2017/007714 A1 | 1/2017 |
| WO | 2017/062482 A1 | 4/2017 |
| WO | 2017/083249 A1 | 5/2017 |
| WO | 2017/083255 A1 | 5/2017 |
| WO | 2016/105543 A9 | 9/2017 |
| WO | 2017/151498 A1 | 9/2017 |
| WO | 2018/010730 A2 | 1/2018 |
| WO | 2018/026669 A1 | 2/2018 |
| WO | 2018/057465 A1 | 3/2018 |
| WO | 2018/057558 A1 | 3/2018 |
| WO | 2018/063902 A1 | 4/2018 |
| WO | 2018/063958 A1 | 4/2018 |
| WO | 2018/063960 A1 | 4/2018 |
| WO | 2018/064642 A1 | 4/2018 |
| WO | 2018/080703 A1 | 5/2018 |
| WO | 2018/080704 A1 | 5/2018 |
| WO | 2018/080705 A1 | 5/2018 |
| WO | 2018/080755 A1 | 5/2018 |
| WO | 2018/080756 A1 | 5/2018 |
| WO | 2018/080765 A1 | 5/2018 |
| WO | 2018/080778 A1 | 5/2018 |
| WO | 2018/080784 A1 | 5/2018 |
| WO | 2018/081246 A1 | 5/2018 |
| WO | 2018/118688 A1 | 6/2018 |
| WO | 2018/118690 A1 | 6/2018 |
| WO | 2018/118695 A1 | 6/2018 |
| WO | 2018/118699 A1 | 6/2018 |

OTHER PUBLICATIONS

Austin, Benson M., "Thick-Film Screen Printing," Solid State Technology, Jun. 1969, pp. 53-58.
Avril, Nicholas Joseph, "Manufacturing Glass-fiber Reinforcement for Grinding Wheels," Massachusetts Institute of Technology, 1996, 105 pgs.
Bacher, Rudolph J., "High Resolution Thick Film Printing," E.I. du Pont de Nemours & Company, Inc., pp. 576-581, date unknown.
Besse, John R., "Understanding and controlling wheel truing and dressing forces when rotary plunge dressing," Cutting Tool Engineering, Jun. 2012, vol. 64, Issue 6, 5 pages.
Brewer, L. et al., Journal of Materials Research, 1999, vol. 14, No. 10, pp. 3907-3912.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, 1 page.
Wu, J. et al., Friction and Wear Properties of Kevlar Pulp Reinforced Epoxy.
J. European Ceramic Society 31, Abstract only (2011) 2073-2081.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
Winter Catalogue No. 5, Dressing tools, Winter diamond tools for dressing grinding wheels, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Vanstrum et al., Precisely Shaped Grain (PSG): 3M's Innovation in Abrasive Grain Technology, date unknown, 1 page.
Graf, "Cubitron II: Precision-Shaped Grain (PSG) Turns the Concept of Gear Grinding Upside Down," gearsolutions.com, May 2014, pp. 36-44.
Dow Machine Tool Accessories, Grinding & Surface Finishing, www.1mta.com, Nov. 2014, 72 pages.

\* cited by examiner

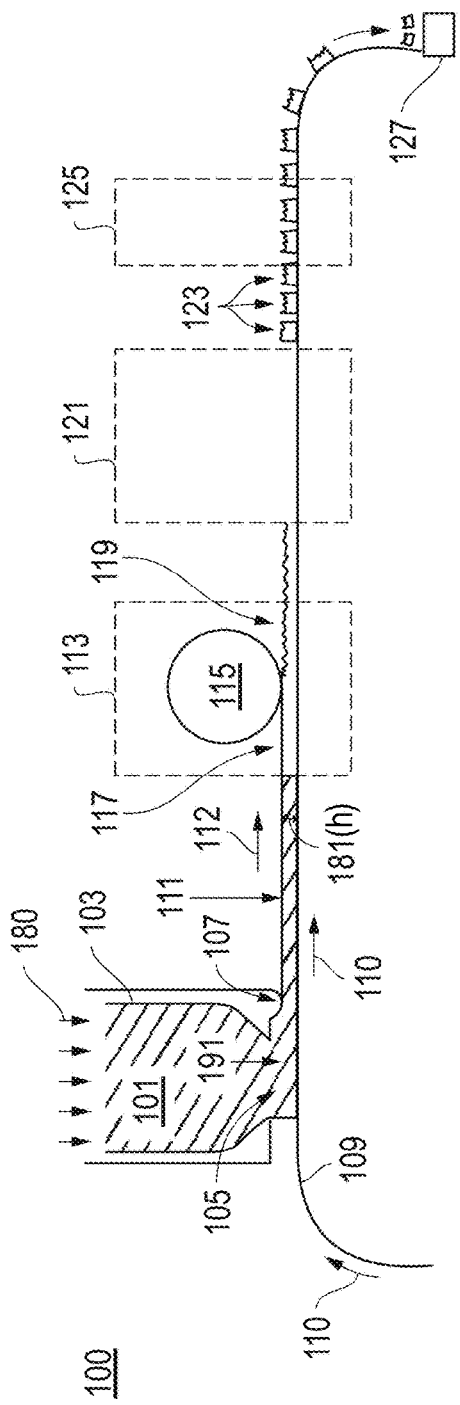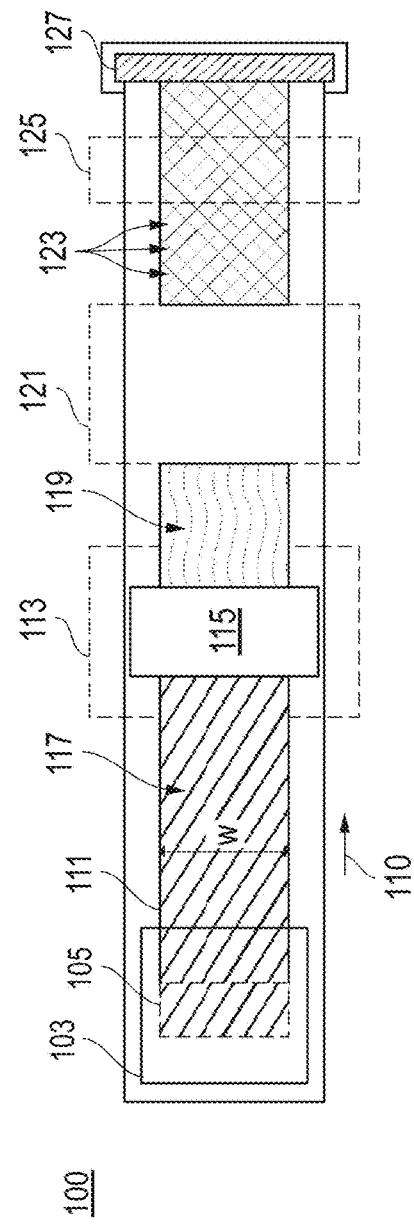
FIG. 1A
FIG. 1B

SHAPED ABRASIVE PARTICLE AND METHOD OF FORMING SAME

CROSS-REFERENCE TO RELATED APPLICATION(S)

The present application is a continuation of U.S. Non-Provisional application Ser. No. 14/335,323, filed Jul. 18, 2014, entitled "SHAPED ABRASIVE PARTICLE AND METHOD OF FORMING SAME," naming inventor Paul Braun et al., which is a continuation of U.S. Non-Provisional application Ser. No. 13/731,810, filed Dec. 31, 2012, entitled "SHAPED ABRASIVE PARTICLE AND METHOD OF FORMING SAME," naming inventor Paul Braun et al., and claims priority from U.S. Provisional Patent Application No. 61/581,800, filed Dec. 30, 2011, entitled "SHAPED ABRASIVE PARTICLE AND METHOD OF FORMING SAME," naming inventor Paul Braun et al., which application is incorporated by reference herein in its entirety.

BACKGROUND

Field of the Disclosure

The following is directed to shaped abrasive particles, and more particularly, to shaped abrasive particles having certain features and methods of forming such shaped abrasive particles.

Description of the Related Art

Abrasive articles incorporating abrasive particles are useful for various material removal operations including grinding, finishing, polishing, and the like. Depending upon the type of abrasive material, such abrasive particles can be useful in shaping or grinding various materials in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Previously, three basic technologies that have been employed to produce abrasive particles having a specified shape, which are fusion, sintering, and chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660. In sintering processes, abrasive particles can be formed from refractory powders having a particle size of up to 10 micrometers in diameter. Binders can be added to the powders along with a lubricant and a suitable solvent to form a mixture that can be shaped into platelets or rods of various lengths and diameters. See, for example, U.S. Pat. No. 3,079,242. Chemical ceramic technology involves converting a colloidal dispersion or hydrosol (sometimes called a sol) to a gel or any other physical state that restrains the mobility of the components, drying, and firing to obtain a ceramic material. See, for example, U.S. Pat. Nos. 4,744,802 and 4,848,041.

The industry continues to demand improved abrasive materials and abrasive articles.

SUMMARY

According to a first aspect, a method of forming a shaped abrasive particle comprises forming a mixture comprising a ceramic material into a sheet, sectioning at least a portion of the sheet with a mechanical object, and forming a shaped abrasive particle from the mixture, wherein the shaped abrasive particle comprises a two-dimensional shape as viewed in a plane defined by a length and a width of the shaped abrasive particle selected from the group consisting of polygons, ellipsoids, numerals, Greek alphabet characters, Latin alphabet characters, Russian alphabet characters, complex shapes having a combination of polygonal shapes, and a combination thereof.

In a second aspect, a particulate material comprises a batch of shaped abrasive particles comprising a first type of shaped abrasive particle comprising a length (l), a width (w), and a height (h), wherein the first type of shaped abrasive particle comprises a first polygonal shape as viewed in a plane defined by the length and width, a second type of shaped abrasive particle comprising a length (l), a width (w), and a height (h), wherein the second type of shaped abrasive particle comprises a second polygonal shape as viewed in a plane defined by the length and width, the second polygonal shape different than the first polygonal shape.

According to a third aspect, a particulate material comprises a shaped abrasive particle having a body comprising a corner-truncated polygonal shape including a first long side, a second long side, and a first short side disposed between the first long side and second long side having a length shorter than the first long side and shorter than the second long side, and a first angle between the first short side and the first long side greater than 90°.

In another aspect, a coated abrasive article includes a substrate, a first type of abrasive particulate material coupled to the substrate having a body comprising a length (l), a width (w), and a height (h), the first type of abrasive particulate material having a first polygonal shape as viewed in a plane defined by the length and width and a second type of shaped abrasive particle coupled to the substrate having a body comprising a length (l), a width (w), and a height (h), the second type of abrasive particulate material having a second polygonal shape as viewed in a plane defined by the length and width different than the first polygonal shape.

For another aspect, a particulate material includes a shaped abrasive particle having a body and including a first major surface, a second major surface, and a side surface extending between the first and second major surfaces, wherein the side surface has a ripple feature.

In yet another aspect, a batch of particulate material includes a first portion having a first type of shaped abrasive particle and a second portion including a second type of shaped abrasive particle having a body defining a length (l), a width (w), and a height (h), wherein the second type of shaped abrasive particle is different than the first type and includes a corner-truncated shape.

According to one aspect, a particulate material includes a shaped abrasive particle having a body including a first major surface, a second major surface, and at least one side surface extending between the first major surface and the second major surface, wherein the side surface has a fractured region intersecting at least a portion of an edge defining the second major surface.

In yet another aspect, a method of forming a shaped abrasive particle comprises forming a mixture comprising a ceramic material into a sheet, sectioning at least a portion of the sheet with a mechanical object, and maintaining the opening in the sheet after sectioning and forming a precursor shaped abrasive particle.

BRIEF DESCRIPTION OF THE DRAWINGS

The present disclosure may be better understood, and its numerous features and advantages made apparent to those skilled in the art by referencing the accompanying drawings.

FIG. 1A includes a schematic of a method of forming a shaped abrasive particle in accordance with an embodiment; FIG. 1B includes a top view of the schematic shown in FIG. 1A.

DETAILED DESCRIPTION

Figure 2:
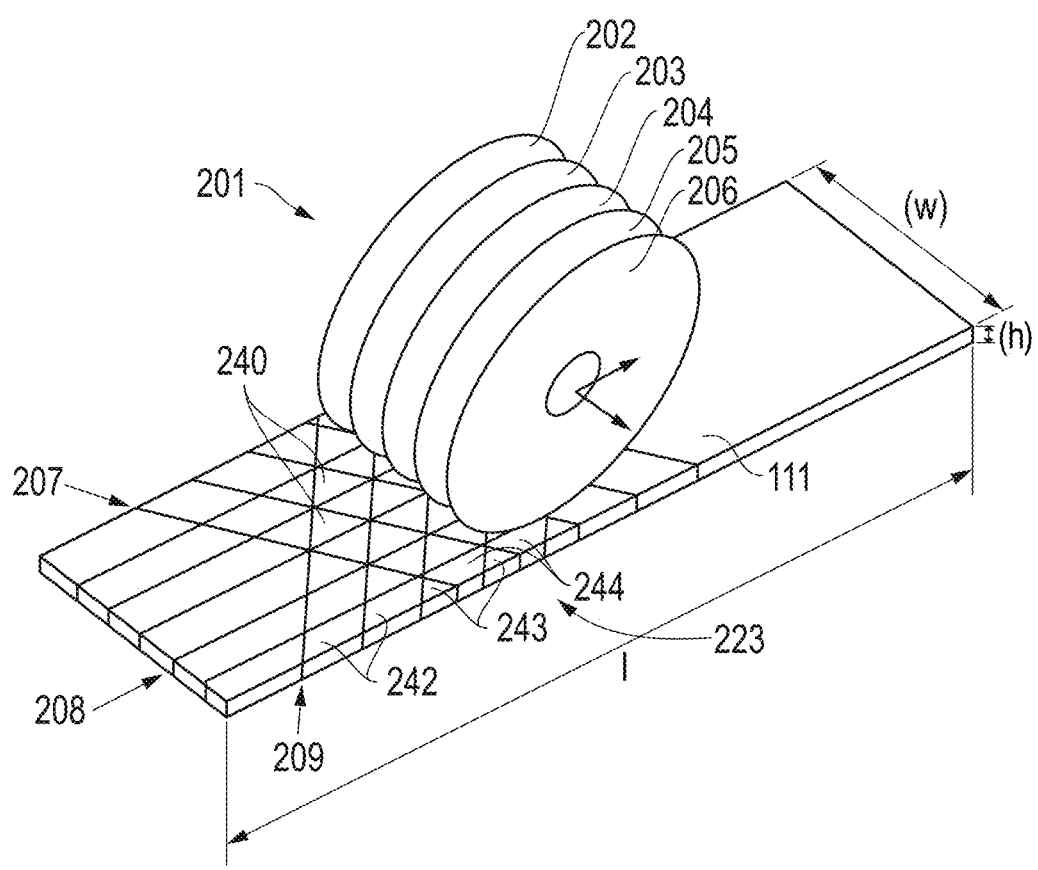
FIG. 2 includes a particular device that can be used in forming a shaped abrasive particle in accordance with an embodiment.

The following is directed to methods of forming shaped abrasive particles and features of such shaped abrasive particles. The shaped abrasive particles may be used in various abrasive articles, including for example bonded abrasive articles, coated abrasive articles, and the like. Alternatively, the shaped abrasive particles of the embodiments herein may be utilized in free abrasive technologies, including for example grinding and/or polishing slurries.

FIG. 1 includes an illustration of a system for forming a shaped abrasive particle in accordance with an embodiment. The process of forming shaped abrasive particles can be initiated by forming a mixture 101 including a ceramic material and a liquid. In particular, the mixture 101 can be a gel formed of a ceramic powder material and a liquid, wherein the gel can be characterized as a shape-stable material having the ability to hold a given shape even in the green (i.e., unfired) state. In accordance with an embodiment, the gel can include a powder material that is an integrated network of discrete particles.

The mixture 101 can be formed to have a particular content of solid material, such as the ceramic powder material. For example, in one embodiment, the mixture 101 can have a solids content of at least about 25 wt %, such as at least about 35 wt %, at least about 38 wt %, or even at least about 42 wt % for the total weight of the mixture 101. Still, in at least one non-limiting embodiment, the solid content of the mixture 101 can be not greater than about 75 wt %, such as not greater than about 70 wt %, not greater than about 65 wt %, or even not greater than about 55 wt %. It will be appreciated that the content of the solids materials in the mixture 101 can be within a range between any of the minimum and maximum percentages noted above.

According to one embodiment, the ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina. The term "boehmite" is generally used herein to denote alumina hydrates including mineral boehmite, typically being $Al_2O_3 \cdot H_2O$ and having a water content on the order of 15%, as well as psuedoboehmite, having a water content higher than 15%, such as 20-38% by weight. It is noted that boehmite (including psuedoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

Furthermore, the mixture 101 can be formed to have a particular content of liquid material. Some suitable liquids may include organic materials, such as water. In accordance with one embodiment, the mixture 101 can be formed to have a liquid content less than the solids content of the mixture 101. In more particular instances, the mixture 101 can have a liquid content of at least about 25 wt % for the total weight of the mixture 101. In other instances, the amount of liquid within the mixture 101 can be greater, such as at least about 35 wt %, at least about 45 wt %, at least about 50 wt %, or even at least about 58 wt %. Still, in at least one non-limiting embodiment, the liquid content of the mixture can be not greater than about 75 wt %, such as not greater than about 70 wt %, not greater than about 65 wt %, not greater than about 60 wt %, or even not greater than about 55 wt %. It will be appreciated that the content of the liquid in the mixture 101 can be within a range between any of the minimum and maximum percentages noted above.

Furthermore, to facilitate processing and forming shaped abrasive particles according to embodiments herein, the mixture 101 can have a particular storage modulus. For example, the mixture 101 can have a storage modulus of at least about $1 \times 10^4$ Pa, such as at least about $4 \times 10^4$ Pa, or even at least about $5 \times 10^4$ Pa. However, in at least one non-limiting embodiment, the mixture 101 may have a storage modulus of not greater than about $1 \times 10^7$ Pa, such as not greater than about $1 \times 10^6$ Pa. It will be appreciated that the storage modulus of the mixture 101 can be within a range between any of the minimum and maximum values noted above. The storage modulus can be measured via a parallel plate system using ARES or AR-G2 rotational rheometers, with Peltier plate temperature control systems. For testing, the mixture 101 can be extruded within a gap between two plates that are set to be approximately 8 mm apart from each other. After extruding the get into the gap, the distance between the two plates defining the gap is reduced to 2 mm until the mixture 101 completely fills the gap between the plates. After wiping away excess mixture, the gap is decreased by 0.1 mm and the test is initiated. The test is an oscillation strain sweep test conducted with instrument settings of a strain range between 0.1% to 100%, at 6.28 rad/s (1 Hz), using 25-mm parallel plate and recording 10 points per decade. Within 1 hour after the test completes, lower the gap again by 0.1 mm and repeat the test. The test can be repeated at least 6 times. The first test may differ from the second and third tests. Only the results from the second and third tests for each specimen should be reported. The viscosity can be calculated by dividing the storage modulus value by 6.28 s-1.

Furthermore, to facilitate processing and forming shaped abrasive particles according to embodiments herein, the mixture 101 can have a particular viscosity. For example, the mixture 101 can have a viscosity of at least about $4 \times 10^3$ Pa s, at least about $5 \times 10^3$ Pa s, at least about $6 \times 10^3$ Pa s, at least about $8 \times 10^3$ Pa s, at least about $10 \times 10^3$ Pa s, at least about $20 \times 10^3$ Pa s, at least about $30 \times 10^3$ Pa s, at least about $40 \times 10^3$ Pa s, at least about $50 \times 10^3$ Pa s, at least about $60 \times 10^3$ Pa s, or even at least about $65 \times 10^3$ Pa s. In at least one non-limiting embodiment, the mixture 101 may have a viscosity of not greater than about $1 \times 10^6$ Pa s, not greater than about $5 \times 10^5$ Pa s, not greater than about $3 \times 10^5$ Pa s, or even not greater than about $2 \times 10^5$ Pa s. It will be appreciated that the viscosity of the mixture 101 can be within a range between any of the minimum and maximum values noted above.

Moreover, the mixture 101 can be formed to have a particular content of organic materials, including for example, organic additives that can be distinct from the liquid, to facilitate processing and formation of shaped abrasive particles according to the embodiments herein. Some suitable organic additives can include stabilizers, binders, such as fructose, sucrose, lactose, glucose, UV curable resins, and the like.

Notably, the embodiments herein may utilize a mixture 101 that is distinct from slurries used in conventional tape casting operations. For example, the content of organic materials within the mixture 101, particularly, any of the organic additives noted above may be a minor amount as compared to other components within the mixture 101. In at least one embodiment, the mixture 101 can be formed to have not greater than about 30 wt % organic material for the total weight of the mixture 101. In other instances, the amount of organic materials may be less, such as not greater than about 15 wt %, not greater than about 10 wt %, or even not greater than about 5 wt %. Still, in at least one non-limiting embodiment, the amount of organic materials within the mixture 101 can be at least about 0.1 wt %, such as at least about 0.5 wt % for the total weight of the mixture 101. It will be appreciated that the amount of organic materials in the mixture 101 can be within a range between any of the minimum and maximum values noted above.

Moreover, the mixture 101 can be formed to have a particular content of acid or base distinct from the liquid, to facilitate processing and formation of shaped abrasive particles according to the embodiments herein. Some suitable acids or bases can include nitric acid, sulfuric acid, citric acid, chloric acid, tartaric acid, phosphoric acid, ammonium nitrate, ammonium citrate. According to one particular embodiment, the mixture 101 can have a pH of less than about 5, and more particularly, within a range between about 2 and about 4, using a nitric acid additive.

Referencing FIG. 1, the system 100 can include a die 103. As illustrated, the mixture 101 can be provided within the interior of the die 103 and configured to be extruded through a die opening 105 positioned at one end of the die 103. As further illustrated, forming can include applying a force 180 (that may be translated into a pressure) on the mixture 101 to facilitate moving the mixture 101 through the die opening 105. In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 4 MPa. It will be appreciated that the pressure used to extrude the mixture 101 can be within a range between any of the minimum and maximum values noted above.

In certain systems, the die 103 can include a die opening 105 having a particular shape. It will be appreciated that the die opening 105 may be shaped to impart a particular shape to the mixture 101 during extrusion. In accordance with an embodiment, the die opening 105 can have a rectangular shape. Furthermore, the mixture 101 extruded through the die opening 105 can have essentially the same cross-sectional shape as the die opening 105. As further illustrated, the mixture 101 may be extruded in the form of a sheet 111 and onto a belt 109 underlying the die 103. In specific instances, the mixture 101 can be extruded in the form of a sheet 111 directly onto the belt 109, which may facilitate continuous processing.

According to one particular embodiment, the belt can be formed to have a film overlying a substrate, wherein the film can be a discrete and separate layer of material configured to facilitate processing and forming of shaped abrasive particles. The process can include providing the mixture 101 directly onto the film of the belt to form the sheet 111. In certain instances, the film can include a polymer material, such as polyester. In at least one particular embodiment, the film can consist essentially of polyester.

In some embodiments, the belt 109 can be translated while moving the mixture 101 through the die opening 105. As illustrated in the system 100, the mixture 101 may be extruded in a direction 191. The direction of translation 110 of the belt 109 can be angled relative to the direction of extrusion 191 of the mixture. While the angle between the direction of translation 110 and the direction of extrusion 191 are illustrated as substantially orthogonal in the system 100, other angles are contemplated, including for example, an acute angle or an obtuse angle. Moreover, while the mixture 101 is illustrated as being extruded in a direction 191, which is angled relative to the direction of translation 110 of the belt 109, in an alternative embodiment, the belt 109 and mixture 101 may be extruded in substantially the same direction.

The belt 109 may be translated at a particular rate to facilitate processing. For example, the belt 109 may be translated at a rate of at least about 3 cm/s. In other embodiments, the rate of translation of the belt 109 may be greater, such as at least about 4 cm/s, at least about 6 cm/s, at least about 8 cm/s, or even at least about 10 cm/s. Still, in at least one non-limiting embodiment, the belt 109 may be translated in a direction 110 at a rate of not greater than about 5 m/s, not greater than about 1 m/s, or even not greater than about 0.5 m/s. It will be appreciated that the screen 151 may be translated at a rate within a range between any of the minimum and maximum values noted above.

For certain processes according to embodiments herein, the rate of translation of the belt 109 as compared to the rate of extrusion of the mixture 101 in the direction 191 may be controlled to facilitate proper processing. For example, the rate of translation of the belt 109 can be essentially the same as the rate of extrusion to ensure formation of a suitable sheet 111.

After the mixture 101 is extruded through the die opening 105, the mixture 101 may be translated along the belt 109 under a knife edge 107 attached to a surface of the die 103. The knife edge 107 may facilitate forming a sheet 111. More particularly, the opening defined between the surface of the knife edge 107 and belt 109 may define particular dimensions of the extruded mixture 101. For certain embodiments, the mixture 101 may be extruded in the form of a sheet 111 having a generally rectangular cross-sectional shape as viewed in a plane defined by a height and width of the sheet 111. While the extrudate is illustrated as a sheet, other shapes can be extruded, including for example cylindrical shapes and the like.

The process of forming the sheet 111 from the mixture 101 can include control of particular features and process parameters to facilitate suitable formation of shaped abrasive particles having one or more features as provided in the embodiments herein. For example, in certain instances, the process of forming a sheet 111 from the mixture 101 can include forming a sheet 111 having a particular height 181 controlled in part by a distance between the knife edge 107 and a surface of the belt 109. Moreover, it is noted that the height 181 of the sheet 111 can be controlled by varying a distance between the knife edge 107 and the surface of the belt 109. Additionally, forming the mixture 101 into the sheet 111 can include controlling the dimensions of the sheet 111 based in part upon the viscosity of the mixture 101. In particular, forming the sheet 111 can include adjusting the height 181 of the sheet 111 based on the viscosity of the mixture 101.

Furthermore, to facilitate processing and forming shaped abrasive particles according to embodiments herein, the mixture 101, and thus the sheet 111, can have a particular viscosity. For example, the mixture 101 can have a viscosity of at least about $4 \times 10^3$ Pa s, at least about $5 \times 10^3$ Pa s, at least about $6 \times 10^3$ Pa s, at least about $8 \times 10^3$ Pa s, at least about $10 \times 10^3$ Pa s, at least about $20 \times 10^3$ Pa s, at least about $30 \times 10^3$ Pa s, at least about $40 \times 10^3$ Pa s, at least about $50 \times 10^3$ Pa s, at least about $60 \times 10^3$ Pa s, or even at least about $65 \times 10^3$ Pa s. In at least one non-limiting embodiment, the mixture 101 may have a viscosity of not greater than about $1 \times 10^6$ Pa s, not greater than about $5 \times 10^5$ Pa s, not greater than about $3 \times 10^5$ Pa s, or even not greater than about $2 \times 10^5$ Pa s. It will be appreciated that the viscosity of the mixture 101 can be within a range between any of the minimum and maximum values noted above. The viscosity can be measured in the same manner as the storage modulus as described above.

The sheet 11 can have particular dimensions, including for example a length (l), a width (w), and a height (h). In accordance with an embodiment, the sheet 111 may have a length that extends in the direction of the translating belt 109, which can be greater than the width, wherein the width of the sheet 111 is a dimension extending in a direction perpendicular to the length of the belt 109 and to the length of the sheet. The sheet 111 can have a height 181, wherein the length and width are greater than the height 181 of the sheet 111.

Notably, the height 181 of the sheet 111 can be the dimension extending vertically from the surface of the belt 109. In accordance with an embodiment, the sheet 111 can be formed to have a particular dimension of height 181, wherein the height may be an average height of the sheet 111 derived from multiple measurements. For example, the height 181 of the sheet 111 can be at least about 0.1 mm, such as at least about 0.5 mm. In other instances, the height 181 of the sheet 111 can be greater, such as at least about 0.8 mm, at least about 1 mm, at least about 1.2 mm, at least about 1.6 mm, or even at least about 2 mm Still, in one non-limiting embodiment, the height 181 of the sheet 111 may be not greater than about 10 mm, not greater than about 5 mm, or even not greater than about 2 mm. It will be appreciated that the sheet 111 may have an average height within a range between any of the minimum and maximum values noted above.

According to one embodiment, the sheet 111 can have a length (l), a width (w), and a height (h), wherein the length≥width≥height. Moreover, the sheet 111 can have a secondary aspect ratio of length:height of at least about 10, such as at least about 100, at least about 1000, or even at least about 1000.

After extruding the mixture 101 from the die 103, the sheet 111 may be translated in a direction 112 along the surface of the belt 109. Translation of the sheet 111 along the belt 109 may facilitate further processing to form precursor shaped abrasive particles. For example, the sheet 111 may undergo a shaping process within the shaping zone 113. In particular instances, the process of shaping can include shaping a surface of the sheet 111, including for example, an upper major surface 117 of the sheet 111. In other embodiments, other major surfaces of the sheet may undergo shaping, including for example, the bottom surface or side surfaces. For certain processes, shaping can include altering a contour of the sheet through one or more processes, such as, embossing, rolling, cutting, engraving, patterning, stretching, twisting, and a combination thereof.

In one particular embodiment, the process of shaping can include forming a feature 119 in the upper major surface 117 of the sheet 111. More particularly, a shaping structure 115 may be contacted to the upper major surface 117 of the sheet 111 facilitating the formation of a feature 119 or a pattern of features in the upper major surface 117. It will be appreciated that the shaping structure 115 can take various forms, including for example, a roller having various features on its surface, wherein such features may be imparted to the upper major surface 117 of the sheet 111 upon contact between the shaping structure 115 and the upper major surface 117.

Still, it will be appreciated that alternative shaping structures and methods of shaping a sheet may be utilized. For example, the surface of the belt 109 may be textured such that features of the texture are imparted to the sheet 111, and the finally-formed shaped abrasive particles. Moreover, various devices may be used to impart a feature or pattern of features on the side surfaces of the sheet 111.

In accordance with an embodiment, the process of forming a shaped abrasive particle can further include translation of the sheet along the belt 109 through a forming zone 121. In accordance with an embodiment, the process of forming a shaped abrasive particle can include sectioning the sheet 111 to form precursor shaped abrasive particles 123. For example, in certain instances, forming can include perforating a portion of the sheet 111. In other instances, the process of forming can include patterning the sheet 111 to form a patterned sheet and extracting shapes from the patterned sheet.

Particular processes of forming can include cutting, pressing, punching, crushing, rolling, twisting, bending, drying, and a combination thereof. In one embodiment, the process of forming can include sectioning of the sheet 111. Sectioning of the sheet 111 can include the use of at least one mechanical object, which may be in the form of a gas, liquid, or solid material. The process of sectioning can include at least one or a combination of cutting, pressing, punching, crushing, rolling, twisting, bending, and drying. Moreover, it will be appreciated that sectioning can include perforating or creating a partial opening through a portion of the sheet 111, which may not extend through the entire height of the sheet 111.

For example, sectioning can include a water jet cutting process. In another embodiment, sectioning of the sheet 111 can include use of a mechanical object including one or a plurality of a blade, a wire, a disc, and a combination thereof. The blades may be oriented relative to each other in a variety of configurations to achieve the desired sectioning. For example, the blades may be arranged parallel to each other, such as in a gang configuration. Alternatively, the mechanical object may include a set of spiral blades connected to each other or independent of each other.

Alternatively, the process of forming shaped abrasive particles can include the use of radiation to section the sheet 111 into discrete precursor shaped abrasive particles. For example, use of radiation may include the use of a laser to score or otherwise cut discrete shaped abrasive particles from the sheet 111.

It will be appreciated that at least one blade may be translated through the sheet 111 to facilitate sectioning. In particular instances, a sectioning process using a blade can include translating a blade in multiple directions including a first direction, and a second direction different than the first direction through the sheet 111. More notably, certain sectioning processes may utilize a plurality of blades that can be translated across and through the sheet 111 in multiple directions to facilitate the formation of precursor shaped abrasive particles 123.

FIG. 2 includes an illustration of a particular device that may be utilized within the forming zone 121 to facilitate sectioning. As illustrated, the process of sectioning may include use of a cutting device 201 having a plurality of blades 202, 203, 204, 205, and 206 arranged in parallel to each other. The cutting device 201 can be translated in multiple directions through the sheet 111 to facilitate the formation of precursor shaped abrasive particles 123. For example, as illustrated in FIG. 2, the cutting device 201 may be translated first in a direction 207 angled with respect to the length (l) of the sheet 111. Thereafter, the cutting device 201 may be translated in a second direction 209 different that the first direction 207 and angled with respect to the first direction 207. Finally, the cutting device 201 may be translated across and through the sheet 111 in a third direction 208 that is different than the first direction 207 or second direction 209 to facilitate the formation of precursor shaped abrasive particles. While reference herein has noted that a single cutting device 201 may be translated in multiple directions, it will be appreciated that individual cutting devices may be utilized for discrete and individual cutting directions.

The process of sectioning can create different types of shaped abrasive particles in a single sectioning process. Different types of shaped abrasive particles can be formed from the same processes of the embodiments herein. Different types of shaped abrasive particles include a first type of shaped abrasive particle having a first two-dimensional shape and a second type of shaped abrasive particle having a different two-dimensional shape as compared to the first two-dimensional shape. Furthermore, different types of shaped abrasive particles may differ from each other in size. For example, different types of shaped abrasive particles may have different volumes as compared to each other. A single process which is capable of forming different types of shaped abrasive particles may be particularly suited for producing certain types of abrasive articles.

As further illustrated, upon sectioning of the sheet 111 with a cutting device 201, a plurality of precursor shaped abrasive particles may be formed in the sheet 111. In particular instances, as illustrated in FIG. 2, a first type of precursor shaped abrasive particles 240 can be formed from the sheet 111. The precursor shaped abrasive particles 240 may have a generally triangular shape two-dimensional shape as viewed in a plane defined by the length (l) and width (w) of the sheet 111.

Furthermore, the sectioning process may form another type of precursor shaped abrasive particles 243 approximate to, and even abutting, the edge of the sheet 111. The precursor shaped abrasive particles 243 can have a triangular two-dimensional shape as viewed in a plane defined by the length (l) and width (w) of the sheet 111. However, the precursor shaped abrasive particles 243 can be smaller in size as compared to the precursor shaped abrasive particles 240. In particular instances, the precursor shaped abrasive particles 243 can have a volume that is not greater than about 95% of the volume of the precursor shaped abrasive particles 240. Volume may be an average value calculated by the measurement of volume for at least 20 shaped abrasive particles of the same type. In other instances, the precursor shaped abrasive particles 243 can have a volume that is not greater than about 92%, not greater than about 90%, not greater than about 85%, such as not greater than about 80%, not greater than about 75%, not greater than about 60%, or even not greater than about 50% of the volume of the precursor shaped abrasive particles 240. Still, in one non-limiting embodiment, the precursor shaped abrasive particles 243 can have a volume that is at least about 10%, such as at least about 20%, at least about 30%, or even at least about 40% of the volume of the precursor shaped abrasive particles 240. The difference in volume between the precursor shaped abrasive particles 243 and precursor shaped abrasive particles 240 can be within a range between any of the minimum and maximum percentages noted above.

Another type of precursor shaped abrasive particles 242 may be formed in the same sectioning process used to form the precursor shaped abrasive particles 240 and 243 from the sheet 111. Notably, the precursor shaped abrasive particles 242 can have a quadrilateral two-dimensional shape as viewed in a plane defined by the width (w) and length (l) of the sheet 111. According to one particular embodiment, the precursor shaped abrasive particles 242 may have a two-dimensional shape of a parallelogram. It will be appreciated that the precursor shaped abrasive particles 242 can have a difference in volume as compared to the other precursor shaped abrasive particles as described in other embodiments herein.

The sectioning process may create another type of shaped abrasive particle 244 used to form the precursor shaped abrasive particles 240, 242, and 243 from the same sheet 111. Notably, the precursor shaped abrasive particles 244 can have a different two-dimensional polygonal shape as compared to the precursor shaped abrasive particles 240, 242, or 243. As illustrated in the embodiment of FIG. 2, the precursor shaped abrasive particles 244 can have a quadrilateral shape, and more particularly, a trapezoidal shape, as viewed in a plane defined by the width (w) and length (l) of the sheet 111. It will be appreciated that the precursor shaped abrasive particles 244 can have a difference in volume as compared to the other precursor shaped abrasive particles as described in other embodiments herein.

Figure 3:
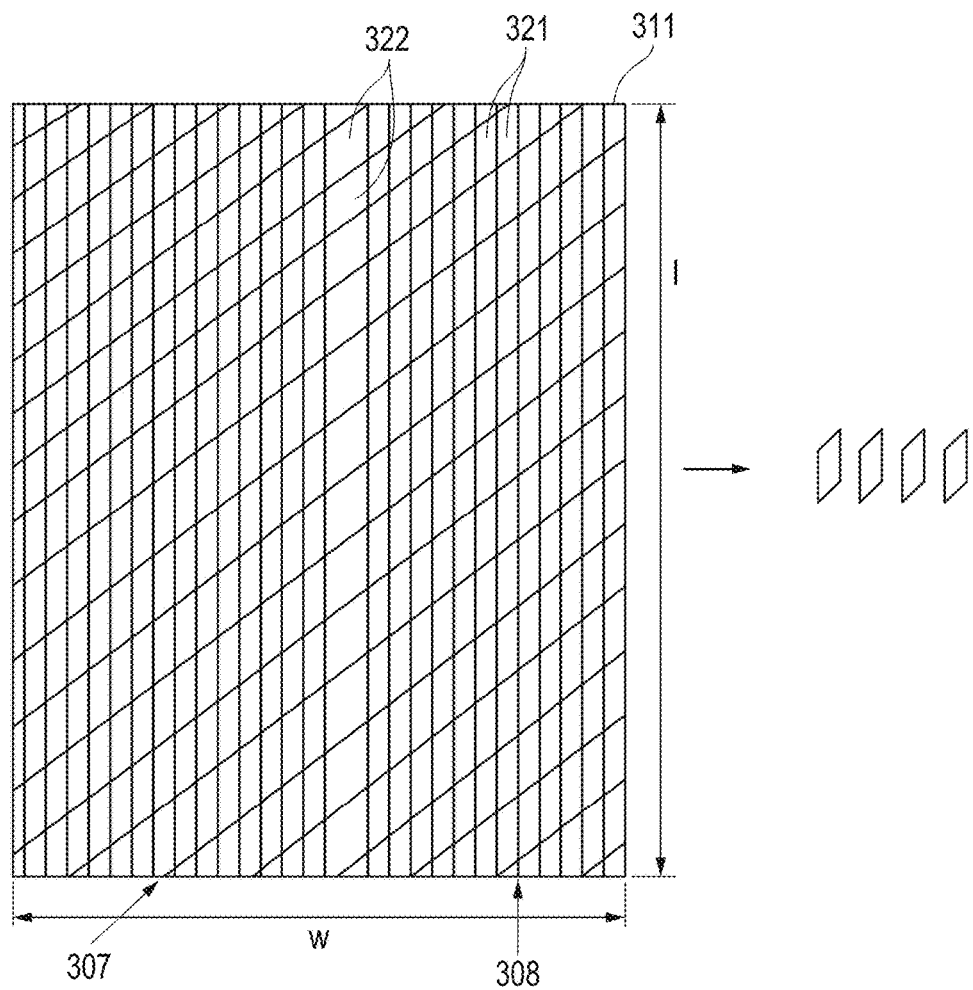
FIG. 3 includes an illustration of a process of forming a shaped abrasive particle in accordance with an embodiment.

FIG. 3 includes an illustration of a portion of a sheet after a sectioning process in accordance with an embodiment. Notably, the sheet 111 can be cut in a first direction 308, and subsequently cut in a second direction 307 at an angle relative to the first direction 308. The sectioning process can create precursor shaped abrasive particles 321 having a generally quadrilateral polygonal shape as viewed in the plane defined by the length and width of the sheet 111. Furthermore, depending upon the sectioning process, a different type of precursor shaped abrasive particles 322 can be created in the same sectioning process used to create the precursor shaped abrasive particles 321. Notably, the precursor shaped abrasive particles 322 can be a different as compared to the precursor shaped abrasive particles 321 in terms of two-dimensional shape, size, and a combination thereof. For example, the precursor shaped abrasive particles 322 can have a greater volume as compared to the precursor shaped abrasive particles 321.

Figure 4A:
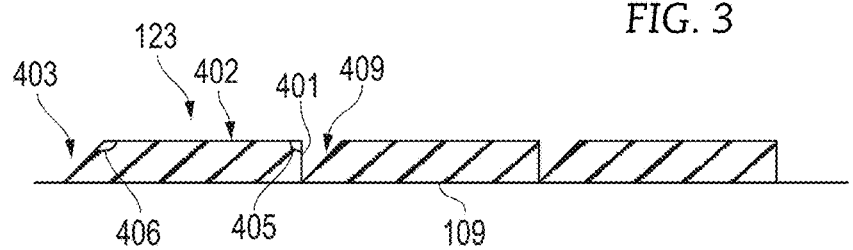
FIG. 4A includes a cross-sectional illustration of a process utilized in forming a shaped abrasive particle in accordance with an embodiment.

FIG. 4 includes a cross-sectional illustration of a portion of a sheet that has been formed into precursor shaped abrasive particles in accordance with an embodiment. Notably, as illustrated in FIG. 4, the precursor shaped abrasive particle 123 can be formed to have particular contours of side surfaces 401 and 403. In accordance with an embodiment, the precursor shaped abrasive particle 123 can have a first side surface 401 formed at a particular angle 405 to the upper surface 402. Likewise, the side surface 403 of the precursor shaped abrasive particle 123 can be joined to the upper surface 402 at a particular angle 406. Notably, the precursor shaped abrasive particle 123 can be formed such that the angle 405 formed between sidewall 401 and upper surface 402 can be different than the angle 406 formed between the sidewall 403 and upper surface 402. Various methods of forming shaped abrasive particles 123 having different angles 405 and 406 can include those methods described herein. In certain instances, a sectioning device may be angled relative to the upper major surface of the sheet to facilitate removal of the material at an angle relative to the plane of the belt and plane of the upper surface of each precursor shaped abrasive particle 123.

Figure 4B:
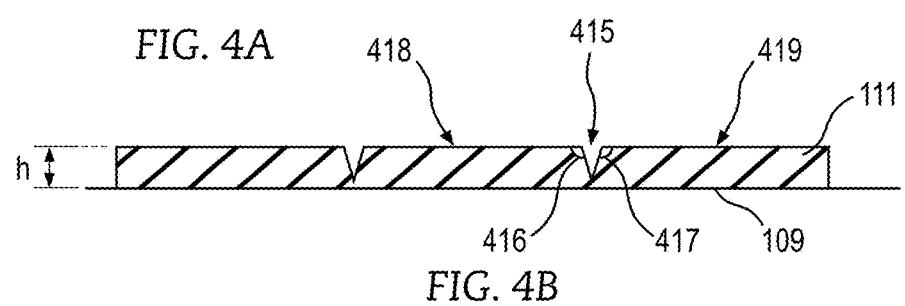
FIG. 4B includes a cross-sectional illustration of a portion of a sheet having an opening according to an embodiment.

Sectioning can include moving the mechanical object through a portion of a sheet 111 and creating an opening within the sheet 111. Referring briefly to FIG. 4B, a cross-sectional illustration of a portion of a sheet after sectioning according to an embodiment is provided. In particular, the sheet 111 has an opening 415 extending into the volume of the sheet 111 and defined by surfaces 416 and 417. The opening 415 can define a cut extending through at least a fraction of the entire height (h) of sheet 111. It will be appreciated that the opening 415 does not necessarily need to extend through the full height of the sheet 111, and in particular instances, it may be suitable that the opening 409 in the sheet 111 is formed such that it does not extend through the entire height of the sheet 111.

In certain instances, the method of sectioning can include maintaining the opening 415 in the sheet 111. Maintaining the opening 415 after sectioning the sheet 111 has been sectioned by a mechanical object may facilitate suitable formation of shaped abrasive particles and features of shaped abrasive particles and features of a batch of shaped abrasive particles. Maintaining the opening 415 can include at least partially drying at least one surface of the sheet 111 defining the opening 415, including for example, one of the surfaces 416 and 417. The process of at least partially drying can include directing a drying material at the opening 415.

A drying material may include a liquid, a solid, or even a gas. According to one particular embodiment, the drying material can include air.

Furthermore, the process of maintaining the opening 415 can include selectively directing a drying material, such as a gas, at the opening 415 and limiting the impingement of gas on other surfaces of the sheet 111, such as the surfaces 418 and 419 substantially spaced apart from the opening 415.

In certain instances, the process of sectioning can be conducted prior to sufficient drying of the sheet. For example, sectioning can be conducted prior to volatilization of not greater than about 20% of the liquid from the sheet 111 as compared to the original liquid content of the sheet during initial formation of the sheet 111. In other embodiments, the amount of volatilization allowed to occur before or during sectioning can be less, such as, not greater than about 15%, not greater than about 12%, not greater than about 10%, not greater than about 8%, or even not greater than about 4% of the original liquid content of the sheet.

As indicated by the description of embodiments herein, sectioning can be conducted simultaneously with the process of forming. Moreover, sectioning can be conducted continuously during the process of forming Sectioning may not necessarily include a change in composition to the sheet, such as in the case of ablation processes, which rely upon vaporization.

According to one embodiment, sectioning can be conducted at particular conditions to facilitate the forming process. For example, sectioning can be conducted at controlled sectioning conditions including at least one of a controlled humidity, a controlled temperature, a controlled air pressure, a controlled air flow, a controlled environmental gas composition, and a combination thereof. Control of such conditions may facilitate control of the drying of the sheet and facilitate formation of shaped abrasive particles having particular features. According to a particular embodiment, sectioning can include monitoring and control of one or more certain environmental conditions, including but not limited to humidity, temperature, air pressure, air flow, environmental gas composition, and a combination thereof, For at least one embodiment, the temperature of the environment used for sectioning (i.e., sectioning temperature) that can be controlled relative to the temperature of the environment used in other processes. For example, the sectioning temperature can be conducted at a substantially different temperature as compared to the temperature used during forming (e.g., extruding) of the sheet. Alternatively, the temperature used during forming of the sheet can be substantially the same as the sectioning temperature. Moreover, in another embodiment, the mechanical object can have a temperature greater than a temperature of the sheet 111 during sectioning. In an alternative condition, the mechanical object can have a temperature less than a temperature of the sheet 111.

For another aspect, the process of sectioning can include providing at least one opening agent to an opening formed in the sheet 111 after sectioning, wherein the opening agent is sufficient to maintain an opening in the sheet after sectioning. Some suitable methods of providing the opening agent can include depositing, coating, spraying, printing, rolling, transferring, and a combination thereof. In one particular embodiment, the mechanical object can be coated with a least one opening agent, wherein the opening agent can be transferred from a surface of the mechanical object to a surface of the sheet defining the opening. The opening agent can include a material selected from the group of inorganic materials, organic materials, polymers, and a combination thereof. In one embodiment, the opening agent may be a foaming agent, surfactant, and a combination thereof.

Referring again to FIG. 1, after forming precursor shaped abrasive particles 123, the particles may be translated through a post-forming zone 125. Various processes may be conducted in the post-forming zone 125, including for example, heating, curing, vibration, impregnation, doping, and a combination thereof.

In one embodiment, the post-forming zone 125 includes a heating process, wherein the precursor shaped abrasive particles 123 may be dried. Drying may include removal of a particular content of material, including volatiles, such as water. In accordance with an embodiment, the drying process can be conducted at a drying temperature of not greater than 300° C. such as not greater than 280° C. or even not greater than about 250° C. Still, in one non-limiting embodiment, the drying process may be conducted at a drying temperature of at least 50° C. It will be appreciated that the drying temperature may be within a range between any of the minimum and maximum temperatures noted above.

Furthermore, the precursor shaped abrasive particles 123 may be translated through a post-forming zone at a particular rate, such as at least about 0.2 feet/min and not greater than about 8 feet/min. Furthermore, the drying process may be conducted for a particular duration. For example, the drying process may be not greater than about six hours.

After the precursor shaped abrasive particles 123 are translated through the post-forming zone 125, the particles may be removed from the belt 109. The precursor shaped abrasive particles 123 may be collected in a bin 127 for further processing.

In accordance with an embodiment, the process of forming shaped abrasive particles may further comprise a sintering process. The sintering process can be conducted after collecting the precursor shaped abrasive particles 123 from the belt 109. Sintering of the precursor shaped abrasive particles 123 may be utilized to densify the particles, which are generally in a green state. In a particular instance, the sintering process can facilitate the formation of a high-temperature phase of the ceramic material. For example, in one embodiment, the precursor shaped abrasive particles 123 may be sintered such that a high-temperature phase of alumina, such as alpha alumina is formed. In one instance, a shaped abrasive particle can comprise at least about 90 wt % alpha alumina for the total weight of the particle. In other instances, the content of alpha alumina may be greater, such that the shaped abrasive particle may consist essentially of alpha alumina.

The body of the shaped abrasive particles may include additives, such as dopants, which may be in the form of elements or compounds (e.g., oxides). Certain suitable additives can include alkali elements, alkaline earth elements, rare-earth elements, hafnium (Hf), zirconium (Zr), niobium (Nb), tantalum (Ta), molybdenum (Mo), and a combination thereof. In particular instances, the additive can include an element such as lithium (Li), sodium (Na), potassium (K), magnesium (Mg), calcium (Ca), strontium (Sr), barium (Ba), scandium (Sc), yttrium (Y), lanthanum (La), cesium (Ce), praseodymium (Pr), niobium (Nb), hafnium (Hf), zirconium (Zr), tantalum (Ta), molybdenum (Mo), vanadium (V), chromium (Cr), cobalt (Co), iron (Fe), germanium (Ge), manganese (Mn), nickel (Ni), titanium (Ti), zinc (Zn), and a combination thereof.

The body of a shaped abrasive article may include a specific content of additive (e.g., dopant). For example, the body of a shaped abrasive particle may include not greater than about 12 wt % additive for the total weight of the body. In still other embodiments, they amount of additive may be less, such as not greater than about 11 wt %, not greater than about 10 wt %, not greater than about 9 wt %, not greater than about 8 wt %, not greater than about 7 wt %, not greater than about 6 wt %, or even not greater than about 5 wt %. Still, the amount of additive in at least one non-limiting embodiment can be at least about 0.5 wt %, such as at least about 1 wt %, at least about 1.3 wt %, at least about 1.8 wt %, at least about 2 wt %, at least about 2.3 wt %, at least about 2.8 wt %, or even at least about 3 wt %. It will be appreciated that the amount of additive within a body of a shaped abrasive particle may be within a range between any of the minimum and maximum percentages noted above.

While the process illustrated in the system 100 has described a shaping process conducted in a shaping zone 113 followed by a forming process at the forming zone 121, and a post-forming process in a post-forming zone, other orders of the processes and zones are contemplated. For example, the process of shaping a surface of the sheet 111 can be conducted after a forming process. In still other instances, the forming process may be completed during the forming process, such that the forming process and shaping process are completed simultaneously. Moreover, while certain processes have been illustrated as being integral with a belt translation system, any of the processes described herein may be completed independent of each other and the belt translation system.

The shaped abrasive particles of the embodiments herein can have a body defined by a length (l), a width (w), and a height (h). The body can include a width (w) that is the longest dimension of the body and extending along a side of the particle. The body may further include a length (l) that can be a dimension extending through a portion of the body, such as the midpoint, or alternatively, may be a dimension extending between particular points on the outer surface of the body (e.g., between opposing corners). It will be appreciated that the body can have a variety of length dimensions depending upon the points of reference. Additionally, the shaped abrasive particle can further include a height (h), which may be a dimension of the shaped abrasive particle extending in a direction substantially perpendicular to the length and width in a direction defined by a side surface of the body 301. Notably, as will be described in more detail herein, the body 301 can be defined by various heights depending upon the location on the body. In specific instances, the width can be greater than or equal to the length, the length can be greater than or equal to the height, and the width can be greater than or equal to the height.

Additionally, the body of a shaped abrasive particle of the embodiments herein can have various two-dimensional shapes. For example, the body can have a two-dimensional shape as viewed in a plane define by the length and width having a polygonal shape, ellipsoidal shape, a numeral, a Greek alphabet character, Latin alphabet character, Russian alphabet character, complex shapes utilizing a combination of polygonal shapes and a combination thereof. Particular polygonal shapes include triangular, rectangular, quadrilateral, pentagon, hexagon, heptagon, octagon, nonagon, decagon, any combination thereof.

Figure 5:
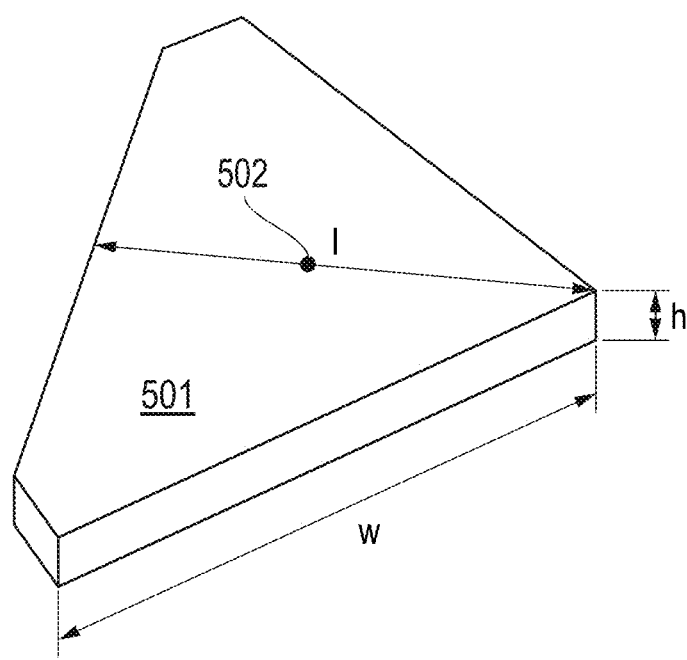
FIG. 5 includes a cross-sectional illustration of a portion of a shaped abrasive particle in accordance with an embodiment.

FIG. 5 includes a perspective view illustration of a shaped abrasive particle in accordance with an embodiment. As illustrated, the shaped abrasive particle can have a corner-truncated triangular shape. In particular, the body 501 of the shaped abrasive particle can have a width (w) extending along a side surface of the body 501, a length extending through a midpoint 502 of the body 501, and a height (h). In accordance with an embodiment, the body 501 can have a primary aspect ratio defined as a ratio of width:length. In certain instances, the primary aspect ratio of the body 501 can be at least about 1.2:1, such as at least about 1.5:1, at least about 2:1, at least about 3:1, or even at least about 4:1. Still, the primary aspect ratio may be not greater than about 100:1. It will be appreciated that the primary aspect ratio of the body 501 may be within a range between any of the minimum and maximum ratios noted above. The dimensions used to calculate the primary aspect ratio may be based upon a median value of a batch of shaped abrasive particles. For example, the length can be based upon a median profile length for a batch of shaped abrasive particles.

Furthermore, the body 501 can have a secondary aspect ratio defined by a ratio of width:height. In certain instances, the secondary aspect ratio of the body 501 may be at least about 1.2:1, such as at least about 1.5:1, at least about 2:1, at least about 3:1, at least about 4:1, at least about 5:1, or even at least about 10:1. Still, in at least one non-limiting embodiment, the body 501 can have a secondary aspect ratio that is not greater than about 100:1. It will be appreciated that the secondary aspect ratio may be within a range between any of the minimum and maximum ratios provided above. The dimensions used to calculate the secondary aspect ratio may be based upon a median value of a batch of shaped abrasive particles. For example, the height can be based upon a median interior height for a batch of shaped abrasive particles.

Furthermore, the shaped abrasive particles of the embodiments herein can have a tertiary aspect ratio defined by a ratio of the length:height. In certain instances, the tertiary aspect ratio of the body 501 may be at least about 1.2:1, such as at least about 1.5:1, at least about 2:1, at least about 3:1, at least about 4:1, at least about 5:1, or even at least about 10:1. Still, in at least one non-limiting embodiment, the body 501 can have a tertiary aspect ratio that is not greater than about 100:1. It will be appreciated that the tertiary aspect ratio may be within a range between any of the minimum and maximum ratios provided above. The dimensions used to calculate the tertiary aspect ratio may be based upon a median value of a batch of shaped abrasive particles. For example, the height can be based upon a median interior height for a batch of shaped abrasive particles.

Figure 6:
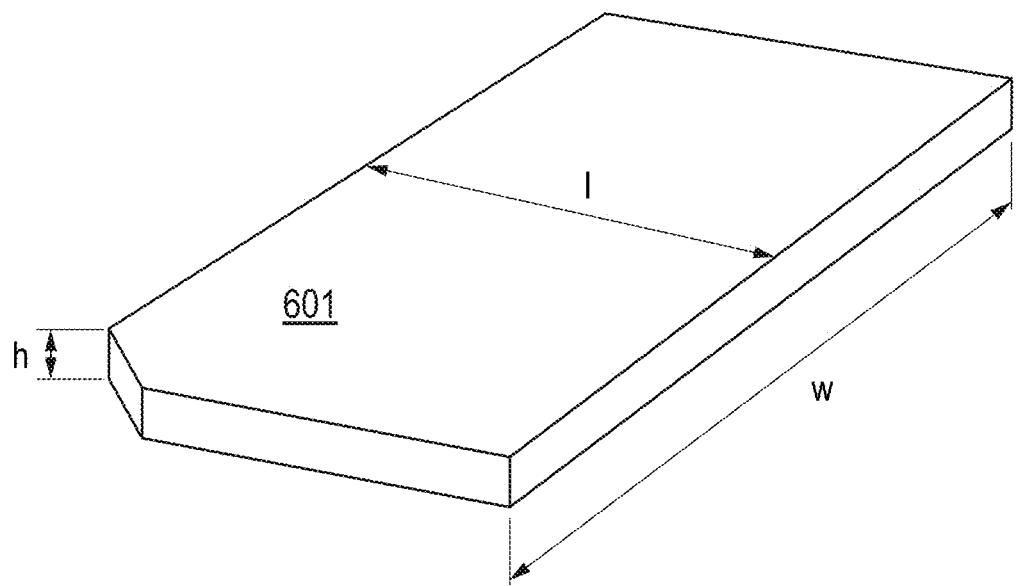
FIG. 6 includes a cross-sectional illustration of a portion of a shaped abrasive particle in accordance with an embodiment.

FIG. 6 includes an illustration of a shaped abrasive particle formed in accordance with an embodiment. Notably, the body 601 can have a generally quadrilateral shape. However, in one particular embodiment, the body 601 may be a corner truncated quadrilateral, and more particularly a corner truncated parallelogram or trapezoidal shape.

Figure 7A:
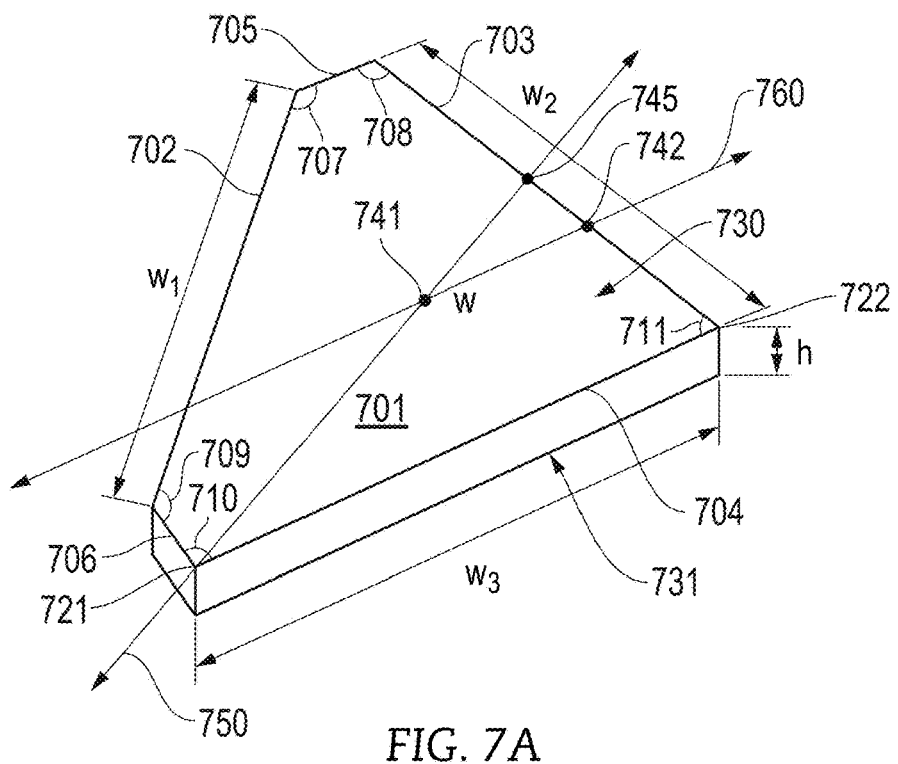
FIG. 7A includes an illustration of a shaped abrasive particle in accordance with an embodiment.

FIG. 7A includes a perspective view illustration of a shaped abrasive particle in accordance with an embodiment. Notably, body 701 can have a first long side 702, a second long side 703, and a third long side 704. Furthermore, the body 701 can include a first short side 705 coupled to the first long side 702 and second long side 703. The body 701 may further include a second short side 706 coupled to the first long side 702 and third long side 704. While the body 701 of the shaped abrasive particle may be considered to have a generally pentagon shape as viewed in a plane defined by the length and width, in particular instances, the body 701 can be defined as a corner truncated triangle, wherein the first short side 705 and second short side 706 define flat surfaces where otherwise a corner, such as corner 722, would exist. Notably, such corner-truncated shapes may represent a significant portion of shaped abrasive particles in a batch, formed through the process described herein, and which will be described in more detail herein.

As illustrated, the body 701 can have a first angle 707 defined between the first long side 702 and first short side 705 as viewed at the upper major surface 730 of the body 701. In accordance with an embodiment, the first angle 707 can be greater than about 90°. In more particular instances, the first angle 707 can be at least about 92°, at least about 95°, at least about 100°, or even at least about 105°. Still, the first angle, in one non-limiting embodiment, can be not greater than about 160°.

The body can further include a second angle 708 formed between the first short side 705 and second long side 703 as viewed at the upper major surface 730 of the body 701. In accordance with an embodiment, the second angle 708 can be the same as the first angle 707. Still, in another embodiment, the second angle 708 can be different than the first angle 707. According to one instance, the second angle 708 can be obtuse. Alternatively, the second angle 708 may be greater than about 90°, and more particularly, at least about 92°, at least about 95°, at least about 100°, or even at least about 105°. Still, the second angle 708, in one non-limiting embodiment, can be not greater than about 160°.

As further illustrated, the body 701 of the shaped abrasive particle can include a third angle 709 defined as the angle between the second short side 706 and first long side 702 as viewed at the upper major surface 730 of the body 701. The third angle 709 may be the same as the first angle 707 or the second angle 708. Alternatively, the third angle 709 may be different than the first angle 707 and second angle 708.

The body 701 can also include a fourth angle 710 defined as the angle between the second short surface 706 and third long surface 704. The fourth angle 710 may be different than the first angle 707, second angle 708, or third angle 709. In particular instances, the fourth angle 710 can be less than the first angle 707, less than the second angle 708, or less than the third angle 709. In at least one particular embodiment, the fourth angle 710 may be substantially orthogonal (90°). In yet other instances, the fourth angle 710 may be greater than 90°.

The body 701 may further include a fifth angle 711 between the third long side 704 and second long side 703 as viewed top down looking at the upper major surface 730 of the body 701. Notably, the fifth angle 711 can be different than the first angle 707, the second angle 708, the third angle 709, or the fourth angle 710. In particular instances, the fifth angle 711 can be less than the first angle 707, less than the second angle 708, less than the third angle 709, or even less than the fourth angle 710. The fifth angle 711 can define the corner 722 of a triangle, and thus be less than about 90°, and more particularly less than about 70°. While the body 710 has been illustrated as having a first short side and a second short side 706, it will be appreciated that the body could incorporate a third short side separating the second long side and third long side 704.

In accordance with an embodiment, the first short side 705 can have a width 781 that is not greater than about 60% of a width of the first long side 702. In other embodiments, the width of the first short side 705 relative to the first long side 702 can be less, such as not greater than about 50%, or not greater than about 40%, not greater than about 30%, not greater than about 28%, or even not greater than about 25%. Still, the short side 705 can be at least about 2%, such as at least about 5%, at least about 10%, at least about 15%, or even at least about 20% of the width of the first long side 702. It will be appreciated that the width of the first short side 705 can be within a range between any of the minimum and maximum percentages noted above.

Moreover, the percentages noted above with respect to the width 781 of the first short side 705 relative to the width of longest side of the particle can be representative of median values for a batch. For example, a batch of shaped abrasive particles may include a content of corner-truncated shapes. The width of the corner-truncated portions can have a median value for the batch. The particles of the batch can also have a median width represented by the median dimension of the longest side of the particles of the batch, or at least the median dimension of the longest side of the particles from a representative sample of the batch. The batch can have a median corner-truncated width of not greater than about 50%, such as not greater than about 40%, not greater than about 30%, not greater than about 28%, or even not greater than about 25% of the median width of the particles of the batch. Still, the batch can include corner-truncated shapes, wherein the median width of the truncated corners can be at least about 2%, such as at least about 5%, at least about 10%, at least about 15%, or even at least about 20% of the median width of the particles. It will be appreciated that the median width of the truncated corners for particles of a batch can be within a range between any of the minimum and maximum percentages noted above.

Furthermore, it will be appreciated that the width of the second short side 706 can have the same characteristics of the first short side 705 relative to the first long side 702. Additionally, the width of the second short side 706 may differ with respect to the width of the first short side 705.

In accordance with an embodiment, the first long side 702 can have a width (w1) that is substantially equal to the width (w2) of the second long side 703. Still, the width (w1) of the first long side 702 may be significantly different than the width (w2) of the second long side 703. Moreover, the width (w1) of the first long side 702 may be substantially the same as the width (w3) of the third long side 704. Alternatively, the width (w1) of the first long side 702 may be significantly different that the width (w3) of the third long side 704. Additionally, the width (w2) of the second long side 703 may be substantially the same as the width (w3) of the third long side 704. Alternatively, the width (w2) of the second long side 703 may be significantly different than the width (w3) of the third long side 704.

Figure 7B:
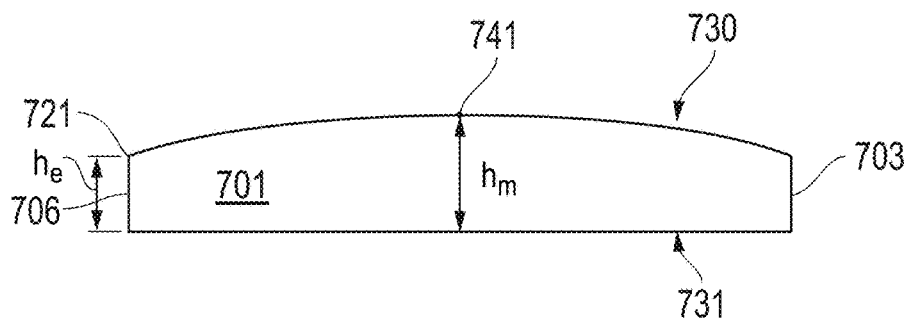
FIGS. 7B and 7C include cross-sectional illustrations of a portion of the shaped abrasive particle of FIG. 7A.

FIG. 7B includes a cross-sectional illustration of a portion of the shaped abrasive particle of FIG. 7A. Notably, the cross-sectional illustration is taken through the axis 750 which is defined by a point at one corner 721 of the body 701 and a midpoint 741 of the body 701. In accordance with a particular embodiment, the body 701 can have a greater height at a midpoint 741 of the shaped abrasive particle as compared to the height of the body measured at the corner 721. In certain instances, the shaped abrasive particles can have a corner/midpoint differential height of at least 1.1, wherein the corner/midpoint differential height (c/mΔh) is a measure of the height of at least one corner of the body divided by the height at the midpoint. In certain embodiments, the corner/midpoint differential height can be greater, such as at least about 1.2, at least about 1.4, wherein the at least about 1.6, at least about 1.8, at least about 2, at least about 2.2, at least about 2.4, at least about 3, or even at least about 4. Still, in one non-limiting embodiment, the corner/midpoint differential height (c/mΔh) can be not greater than about 20, such as not greater than about 18, not greater than about 15, not greater than about 12, not greater than about 10, not greater than about 8, not greater than about 6, or even not greater than about 4. It will be appreciated that the shaped abrasive particles herein can have a body having a corner/midpoint differential height (c/mΔh) within a range between any of the minimum and maximum values noted above.

Still, it will be appreciated that the foregoing is an example, and in other instances, the corner height of the body can be greater than the midpoint height. In particular instances, the body can have a midpoint/corner differential height within a range of any of the minimum and maximum values noted above for the corner/midpoint differential height.

Figure 7C:
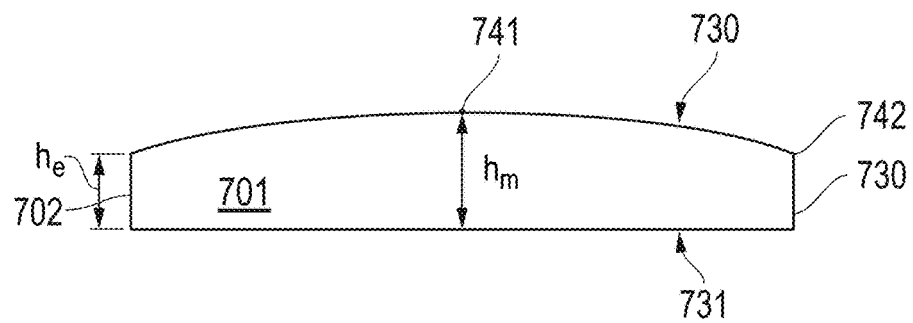

FIG. 7C includes a cross-sectional illustration of a portion of the shaped abrasive particle of FIG. 7A. In particular, FIG. 7C includes a cross-sectional illustration of the shaped abrasive particle along axis 760, which is defined as an axis extending through the midpoint 741 and a midpoint 742 of a side 703 of the body 701. In accordance with one embodiment, the body 701 can have a greater height at a midpoint 741 of the body 701 than a height at a midpoint edge 742 of the body 701. Notably, the shaped abrasive particles can have an edge/midpoint differential height (e/mΔt) of at least 1.1, wherein the edge/midpoint differential height is a measure of the height of the body on an edge of the side surface at the midpoint between two corners divided by the height of at the midpoint In other embodiments, the edge/midpoint differential height (e/mΔt) can be greater, such as at least about 1.2, at least about 1.4, wherein the at least about 1.6, at least about 1.8, at least about 2, at least about 2.2, at least about 2.4, at least about 3, or even at least about 4. Still, in one non-limiting embodiment, the edge/midpoint differential height (e/mΔt) can be not greater than about 20, such as not greater than about 18, not greater than about 15, not greater than about 12, not greater than about 10, not greater than about 8, not greater than about 6, or even not greater than about 4. It will be appreciated that the shaped abrasive particles herein can have a body having an edge/midpoint differential height (e/mΔt) within a range between any of the minimum and maximum values noted above.

Still, it will be appreciated that the foregoing is an example, and in other instances, the edge height of the body can be greater than the midpoint height. In particular instances, the body can have a midpoint/edge differential height within a range of any of the minimum and maximum values noted above for the edge/midpoint differential height.

Figure 8:
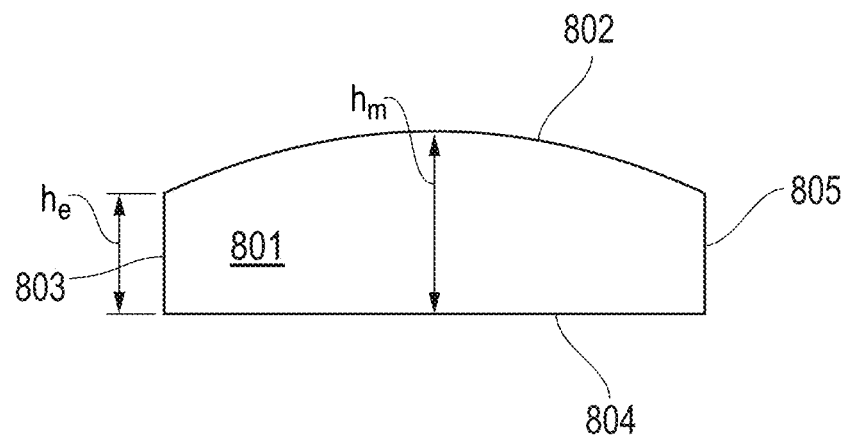
FIGS. 8-13 include illustrations of shaped abrasive particles according to embodiments herein.

FIG. 8 includes a cross-sectional illustration of a portion of a shaped abrasive particle in accordance with an embodiment. Notably, the shaped abrasive particle can include a body 801 having a bottom surface 804, an upper major surface 802 opposite the bottom surface 804, and a side surface 803 joining the bottom surface 804 and upper major surface 802. As further illustrated, the body 801 can include a side surface 805 opposite the side surface 803 joining the bottom surface 804 and upper major surface 802. In accordance with a particular embodiment, as illustrated in FIG. 8, the body 801 can have a curved or linear upper major surface 802. Notably, in some instances, the upper major surface 802 can have a convex contour such that the height of the body 801 at the midpoint ($t_m$) is greater than the height at either one of the side surfaces ($t_s$) 803 or 805. For some embodiments, the bottom surface 802 may be substantially planer as compared to the upper major surface 802.

Figure 9:
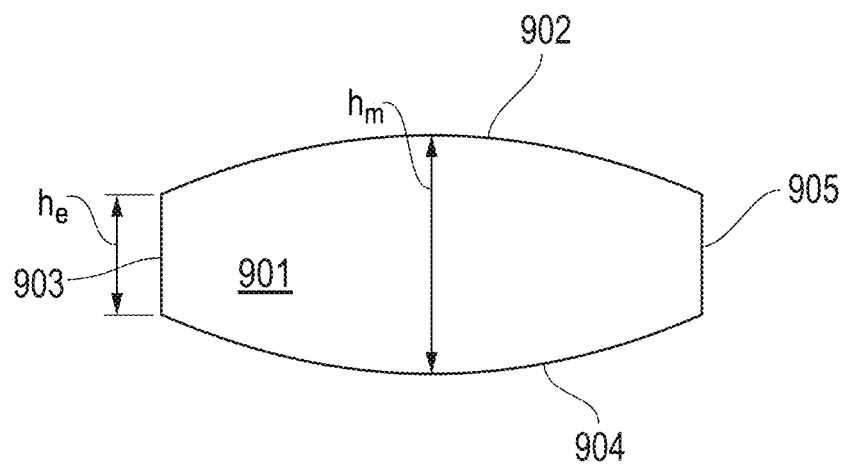

FIG. 9 includes a cross-sectional illustration of an alternative shaped abrasive particle in accordance with an embodiment. Notably, the shaped abrasive particle can have a body 901 including a bottom surface 904, an upper major surface 902 opposite the bottom surface 904, and side surfaces 903 and 905 opposite each other and joining the bottom surface 905 and upper major surface 902. As illustrated, the body 901 can have a particularly unique contour, wherein the upper major surface 902 has a convex contour, and the bottom surface 904 also has a convex contour such that the height at the midpoint ($t_m$) is significantly greater than the height of the body 901 at the edges ($t_e$) defined by surfaces 901 and 905.

The shaped abrasive particles of embodiments herein can have a particular size, as measured by the width of the body. For example, the shaped abrasive particles may have a median particle size of not greater than about 5 mm. Alternatively, the median particle may be less, such as not greater than about 4 mm, not greater than about 3 mm, not greater than about 2 mm, or even not greater than about 1.5 mm. In still another aspect, the median particle size of the shaped abrasive particles can be at least about 10 microns, at least about 100 microns, at least about 200 microns, at least about 400 microns, at least about 600 microns, or even at least about 800 microns. It will be appreciated that the median particle size of the shaped abrasive particles can be within a range between any of the above minimum and maximum values.

The shaped abrasive particles of embodiments herein can have a particular grain size, which can be a measure of crystalline grain size within the particle, particularly for grains of alpha alumina. For example, the shaped abrasive particles may have an average grain size of not greater than about 500 microns, such as not greater than about 250 microns, or even not greater than about 100 microns, not greater than about 50 microns, not greater than about 20 microns, or even not greater than about 1 micron. In another aspect, the average grain size can be at least about 0.01 microns, such as at least about 0.05 microns, at least about 0.08 microns, or even at least about 0.1 microns. It will be appreciated that the average grain size of the shaped abrasive particles can be within a range between any of the above minimum and maximum values.

Figure 10:
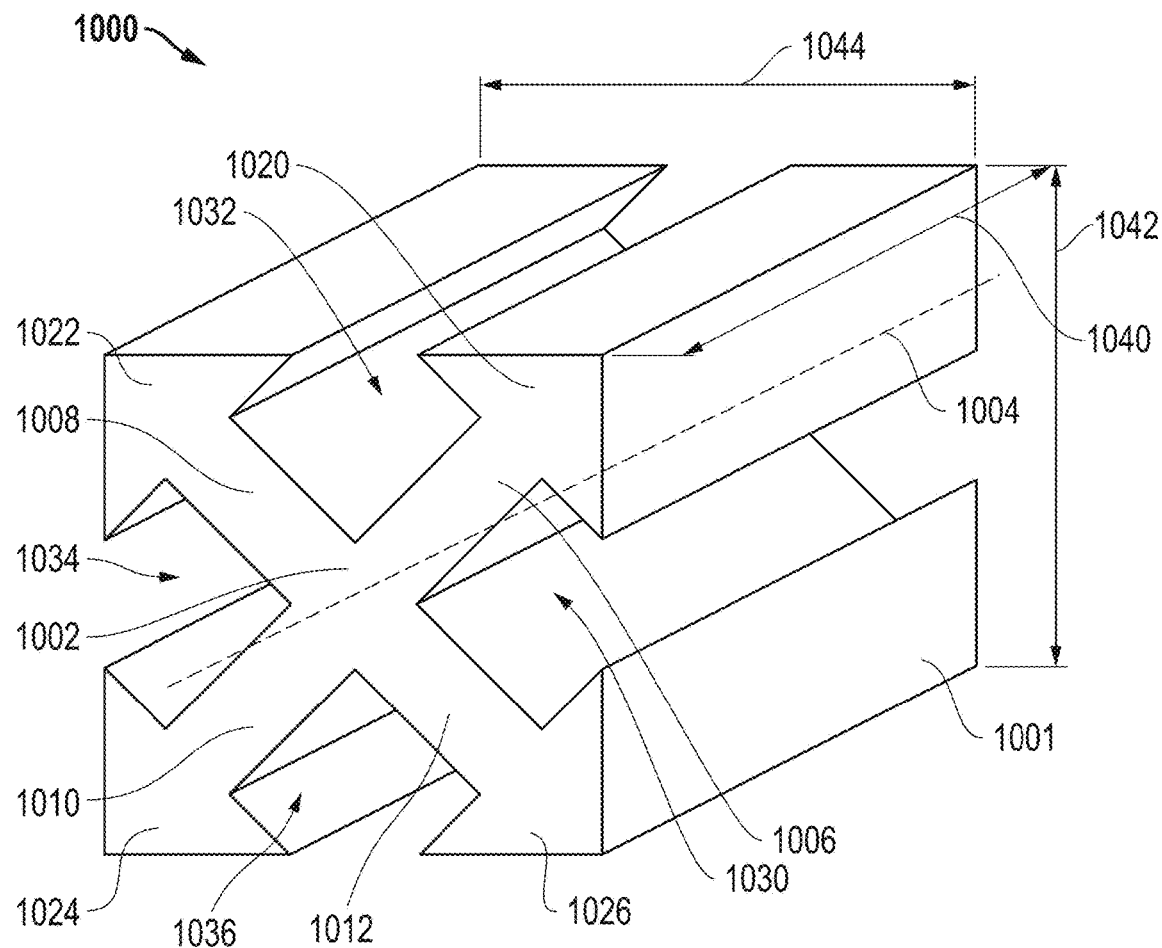

FIG. 10 includes an illustration of a shaped abrasive particle according to another embodiment. As depicted, the shaped abrasive particle 1000 may include a body 1001 that may be formed according to an embodiment herein. Notably, the shaped abrasive particle may be formed from an extruded sheet via a punching process. The body 1001 can include a central portion 1002 that extends along a longitudinal axis 1004. A first radial arm 1006 may extend outwardly from the central portion 1002 along the length of the central portion 1002. A second radial arm 1008 may extend outwardly from the central portion 1002 along the length of the central portion 1002. A third radial arm 1010 may extend outwardly from the central portion 1002 along the length of the central portion 1002. Moreover, a fourth radial arm 1012 may extend outwardly from the central portion 1002 along the length of the central portion 1002. The radial arms 1006, 1008, 1010, 1012 may be equally spaced around the central portion 1002 of the shaped abrasive particle 1000.

As shown in FIG. 10, the first radial arm 1006 may include a generally arrow shaped distal end 1020. The second radial arm 1008 may include a generally arrow shaped distal end 1022. The third radial arm 1010 may include a generally arrow shaped distal end 1024. Further, the fourth radial arm 1012 may include a generally arrow shaped distal end 1026.

FIG. 10 also illustrates that the shaped abrasive particle 1000 may be formed with a first void 1030 between the first radial arm 1006 and the second radial arm 1008. A second void 1032 may be formed between the second radial arm 1008 and the third radial arm 1010. A third void 1034 may also be formed between the third radial arm 1010 and the fourth radial arm 1012. Additionally, a fourth void 1036 may be formed between the fourth radial arm 1012 and the first radial arm 1006.

Figure 11:
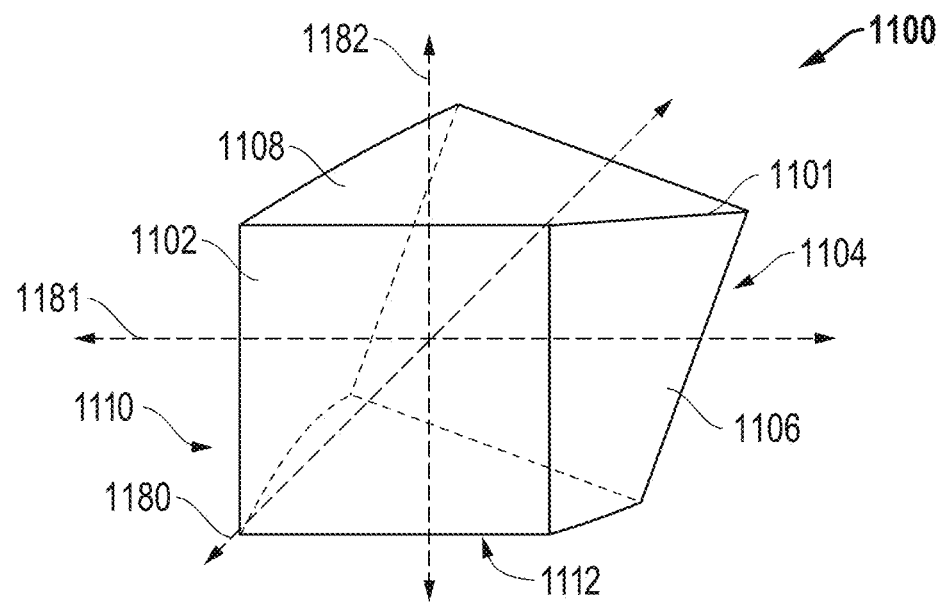
Figure 12:
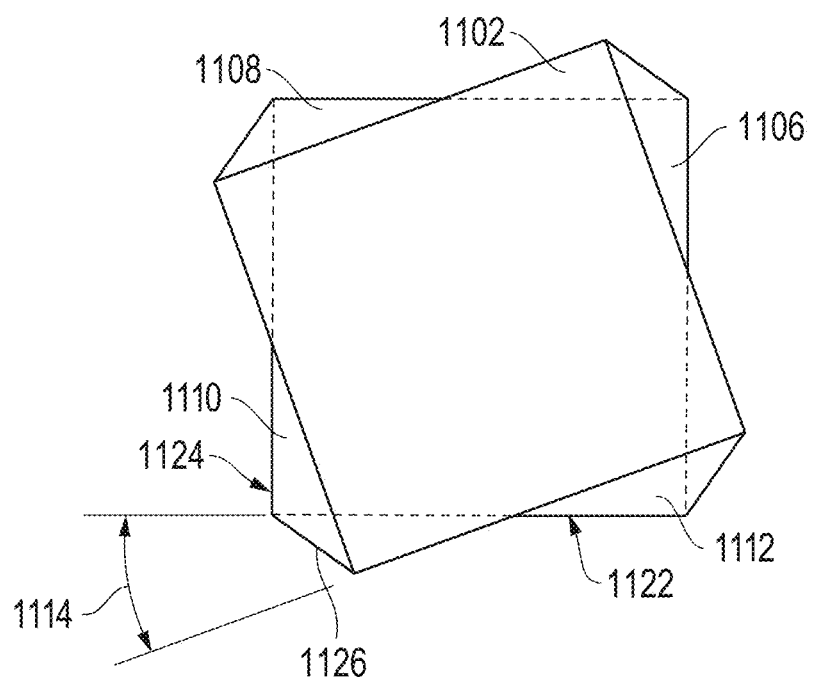

FIGS. 11 and 12 include an illustration of a shaped abrasive particle according to another embodiment. As shown, the shaped abrasive particle 1100 may include a body 1101 that has a generally cube-like shape. It will be appreciated that the shaped abrasive particle may be formed to have other polyhedral shapes. The body 1101 may have a first end face 1102 and a second end face 1104, a first lateral face 1106 extending between the first end face 1102 and the second end face 1104, a second lateral face 1108 extending between the first end face 1102 and the second end face 1104. Further, the body 1101 can have a third lateral face 1110 extending between the first end face 1102 and the second end face 1104, and a fourth lateral face 1112 extending between the first end face 1102 and the second end face 1104.

As shown, the first end face 1102 and the second end face 1104 can be parallel to each other and separated by the lateral faces 1106, 1108, 1110, and 1112, giving the body a cube-like structure. However, in a particular aspect, the first end face 1102 can be rotated with respect to the second end face 1104 to establish a twist angle 1114. In particular instances, the shaped abrasive particle 1100 can be formed from the processes described herein, including sectioning a sheet, and more particularly sectioning a sheet that has been torqued or twisted in a particular manner to impart a twist angle to the finally-formed shaped abrasive particle. In certain instances, the twist of the body 1101 can be along one or more axes and define particular types of twist angles. For example, as illustrated in a top-down view of the body in FIG. 12 looking down the longitudinal axis 1180 defining a length of the body 1101 on the end face 1102 parallel to a plane defined by the lateral axis 1181 extending along a dimension of width of the body 1101 and the vertical axis 1182 extending along a dimension of height of the body 1101. According to one embodiment, the body 1101 can have a longitudinal twist angle 1114 defining a twist in the body 1101 about the longitudinal axis such that the end faces 1102 and 1104 are rotated relative to each other. The twist angle 1114, as illustrated in FIG. 12 can be measured as the angle between a tangent of a first edge 1122 and a second edge 1124, wherein the first edge 1122 and second edge 1124 are joined by and share a common edge 1126 extending longitudinally between two of the lateral faces (1110 and 1112). It will be appreciated that other shaped abrasive particles can be formed to have twist angles relative to the lateral axis, the vertical axis, and a combination thereof. Any such twist angles can have a value as described in the embodiments herein.

In a particular aspect, the twist angle 1114 can be at least about 1°. In other instances, the twist angle 1114 can be greater, such as at least about 2°, at least about 5°, at least about 8°, at least about 10°, at least about 12°, at least about 15°, at least about 18°, at least about 20°, at least about 25°, at least about 30°, at least about 40°, at least about 50°, at least about 60°, at least about 70°, at least about 80°, or even at least about 90°. Still, according to certain embodiments, the twist angle 1114 can be not greater than about 360°, such as not greater than about 330°, such as not greater than about 300°, not greater than about 270°, not greater than about 230°, not greater than about 200°, or even not greater than about 180°. It will be appreciated that certain shaped abrasive particles can have a twist angle within a range between any of the minimum and maximum angles noted above.

Figure 13:
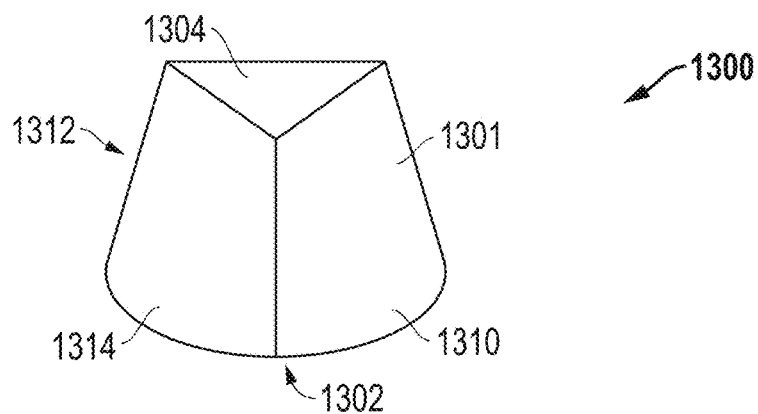

FIG. 13 includes an illustration of a shaped abrasive particle according to an embodiment. The shaped abrasive grain 1300 may include a body 1301 including a base surface 1302 and an upper surface 1304 separated from each other by one or more side surfaces 1310, 1312, and 1314. According to one particular embodiment, the body 1301 can be formed such that the base surface 1302 has a planar shape different than a planar shape of the upper surface 1304, wherein the planar shape is viewed in the plane defined by the respective surface. For example, as illustrated in the embodiment of FIG. 13, the body 1301 can have base surface 1302 generally have a circular shape and an upper surface 1304 having a generally triangular shape. It will be appreciated that other variations are feasible, including any combination of shapes at the base surface 1302 and upper surface 1304.

Figure 14:
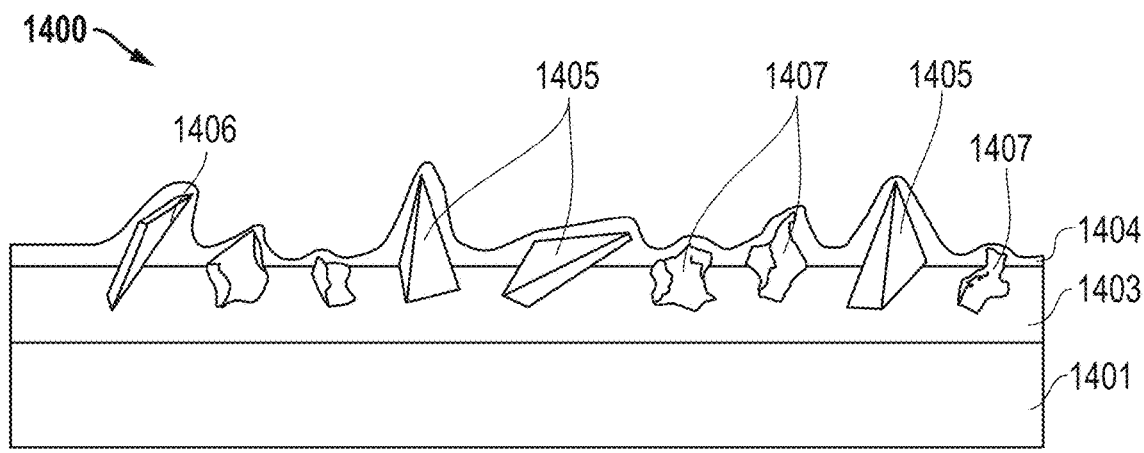
FIG. 14 includes a cross-sectional illustration of a coated abrasive article including shaped abrasive particles in accordance with an embodiment.

FIG. 14 includes a cross-sectional illustration of a coated abrasive article incorporating the abrasive particulate material in accordance with an embodiment. As illustrated, the coated abrasive 1400 can include a substrate 1401 and a make coat 1403 overlying a surface of the substrate 1401. The coated abrasive 1400 can further include a first type of abrasive particulate material 1405 in the form of a first type of shaped abrasive particle, a second type of abrasive particulate material 1406 in the form of a second type of shaped abrasive particle, and a third type of abrasive particulate material in the form of diluent abrasive particles, which may not necessarily be shaped abrasive particles, and having a random shape. The coated abrasive 1400 may further include size coat 1404 overlying and bonded to the abrasive particulate materials 1405, 1406, 1407, and the make coat 1404.

According to one embodiment, the substrate 1401 can include an organic material, inorganic material, and a combination thereof. In certain instances, the substrate 1401 can include a woven material. However, the substrate 1401 may be made of a non-woven material. Particularly suitable substrate materials can include organic materials, including polymers, and particularly, polyester, polyurethane, polypropylene, polyimides such as KAPTON from DuPont, paper. Some suitable inorganic materials can include metals, metal alloys, and particularly, foils of copper, aluminum, steel, and a combination thereof.

The make coat 1403 can be applied to the surface of the substrate 1401 in a single process, or alternatively, the abrasive particulate materials 1405, 1406, 1407 can be combined with a make coat 1403 material and applied as a mixture to the surface of the substrate 1401. Suitable materials of the make coat 1403 can include organic materials, particularly polymeric materials, including for example, polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. In one embodiment, the make coat 1403 can include a polyester resin. The coated substrate can then be heated in order to cure the resin and the abrasive particulate material to the substrate. In general, the coated substrate 1401 can be heated to a temperature of between about 100° C. to less than about 250° C. during this curing process.

The abrasive particulate materials 1405, 1406, and 1407 can include different types of shaped abrasive particles according to embodiments herein. The different types of shaped abrasive particles can differ from each other in composition, two-dimensional shape, three-dimensional shape, size, and a combination thereof as described in the embodiments herein. As illustrated, the coated abrasive 1400 can include a first type of shaped abrasive particle 1405 having a generally triangular two-dimensional shape and a second type of shaped abrasive particle 1406 having a quadrilateral two-dimensional shape. The coated abrasive 1400 can include different amounts of the first type and second type of shaped abrasive particles 1405 and 1406. It will be appreciated that the coated abrasive may not necessarily include different types of shaped abrasive particles, and can consist essentially of a single type of shaped abrasive particle.

The abrasive particles 1407 can be diluent particles different than the first and second types of shaped abrasive particles 1405 and 1406. For example, the diluent particles can differ from the first and second types of shaped abrasive particles 1405 and 1406 in composition, two-dimensional shape, three-dimensional shape, size, and a combination thereof. For example, the abrasive particles 1407 can represent conventional, crushed abrasive grit having random shapes. The abrasive particles 1407 may have a median particle size less than the median particle size of the first and second types of shaped abrasive particles 1405 and 1406.

After sufficiently forming the make coat 1403 with the abrasive particulate materials 1405, 1406, 1407 contained therein, the size coat 1404 can be formed to overlie and bond the abrasive particulate material 1405 in place. The size coat 1404 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

Figure 15:
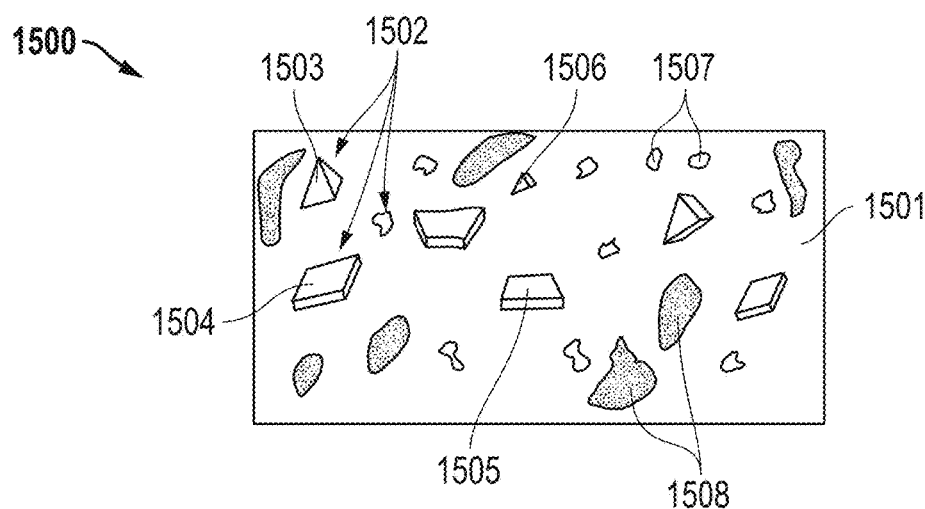
FIG. 15 includes an illustration of a bonded abrasive article including shaped abrasive particles in accordance with an embodiment.

FIG. 15 includes an illustration of a bonded abrasive article incorporating the abrasive particulate material in accordance with an embodiment. As illustrated, the bonded abrasive 1500 can include a bond material 1501, abrasive particulate material 1502 contained in the bond material, and porosity 1508 within the bond material 1501. In particular instances, the bond material 1501 can include an organic material, inorganic material, and a combination thereof. Suitable organic materials can include polymers, such as epoxies, resins, thermosets, thermoplastics, polyimides, polyamides, and a combination thereof. Certain suitable inorganic materials can include metals, metal alloys, vitreous phase materials, crystalline phase materials, ceramics, and a combination thereof.

The abrasive particulate material 1502 of the bonded abrasive 1500 can include different types of shaped abrasive particles 1503, 1504, 1505, and 1506, which can have any of the features of different types of shaped abrasive particles as described in the embodiments herein. Notably, the different types of shaped abrasive particles 1503, 1504, 1505, and 1506 can differ from each other in composition, two-dimensional shape, three-dimensional shape, size, and a combination thereof as described in the embodiments herein.

The bonded abrasive 1500 can include a type of abrasive particulate material 1507 representing diluent abrasive particles, which can differ from the different types of shaped abrasive particles 1503, 1504, 1505, and 1506 in composition, two-dimensional shape, three-dimensional shape, size, and a combination thereof.

The porosity 1508 of the bonded abrasive 1500 can be open porosity, closed porosity, and a combination thereof. The porosity 1508 may be present in a majority amount (vol %) based on the total volume of the body of the bonded abrasive 1500. Alternatively, the porosity 1508 can be present in a minor amount (vol %) based on the total volume of the body of the bonded abrasive 1500. The bond material 1501 may be present in a majority amount (vol %) based on the total volume of the body of the bonded abrasive 1500. Alternatively, the bond material 1501 can be present in a minor amount (vol %) based on the total volume of the body of the bonded abrasive 1500. Additionally, abrasive particulate material 1502 can be present in a majority amount (vol %) based on the total volume of the body of the bonded abrasive 1500. Alternatively, the abrasive particulate material 1502 can be present in a minor amount (vol %) based on the total volume of the body of the bonded abrasive 1500.

Figure 16A:
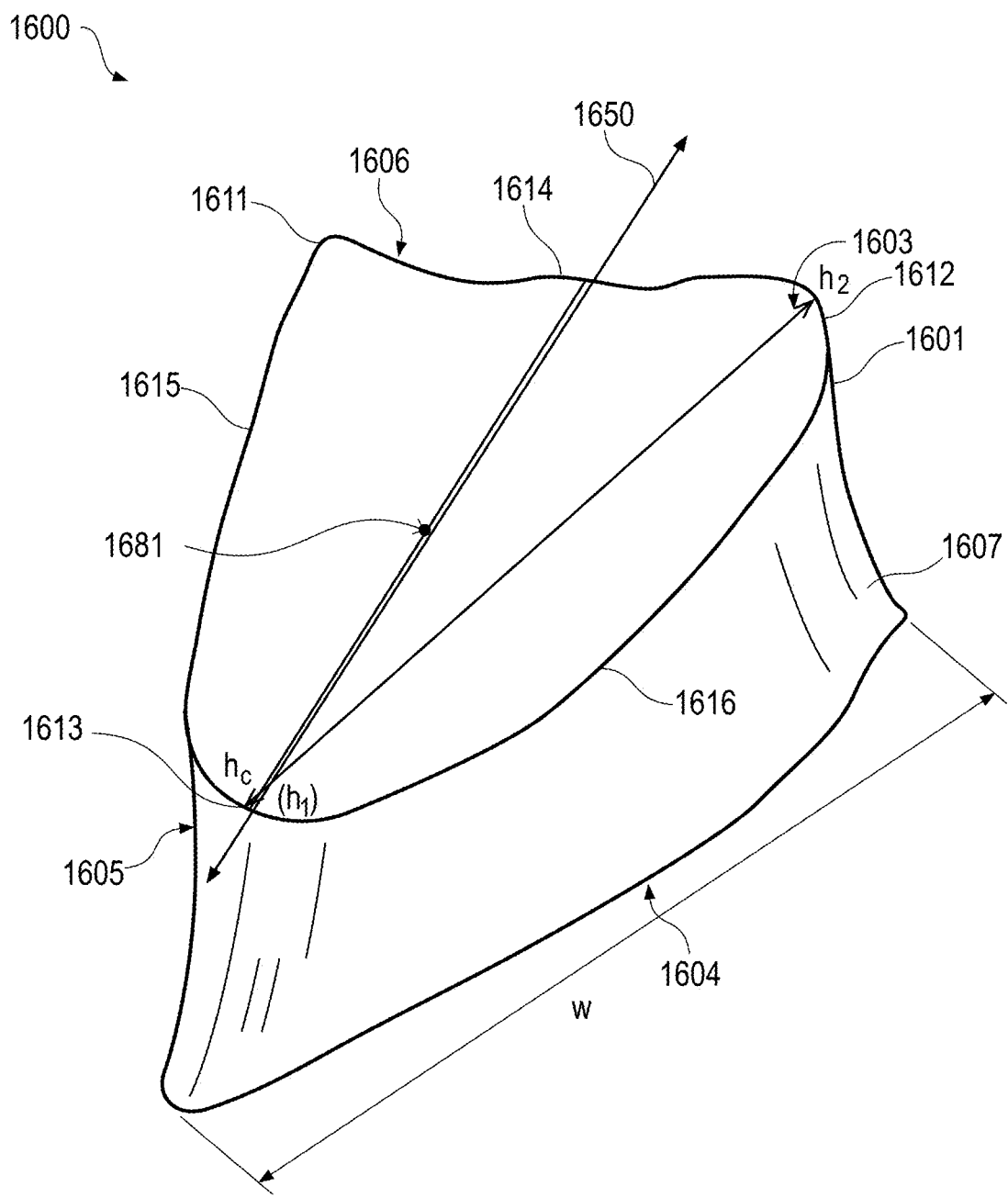
FIG. 16A includes an illustration of a shaped abrasive particle according to an embodiment.
Figure 16B:
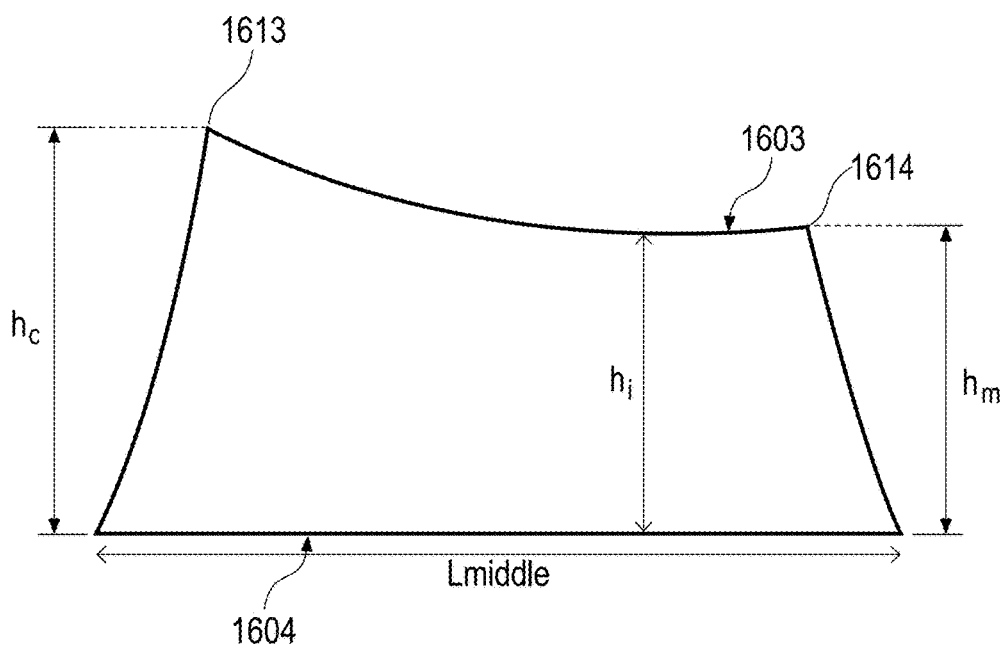
FIG. 16B includes a cross-sectional view of the shaped abrasive particle of FIG. 16B.

FIG. 16A includes a perspective view illustration of an abrasive particle in accordance with an embodiment. Additionally, FIG. 16B includes a cross-sectional illustration of the abrasive particle of FIG. 16A. The body 1601 includes an upper surface 1603 a bottom major surface 1604 opposite the upper surface 1603. The upper surface 1603 and the bottom surface 1604 can be separated from each other by side surfaces 1605, 1606, and 1607. As illustrated, the body 1601 of the shaped abrasive particle 1600 can have a generally triangular shape as viewed in a plane of the upper surface 1603. In particular, the body 16 can have a length (Lmiddle) as shown in FIG. 16B, which may be measured at the bottom surface 1604 of the body 1601 and extending from a corner 1613 through a midpoint 1681 of the body 1601 to a midpoint at the opposite edge 1614 of the body. Alternatively, the body can be defined by a second length or profile length (Lp), which is the measure of the dimension of the body from a side view at the upper surface 1603 from a first corner 1613 to an adjacent corner 1612. Notably, the dimension of Lmiddle can be a length defining a distance between a height at a corner (hc) and a height at a midpoint edge (hm) opposite the corner. The dimension Lp can be a profile length along a side of the particle defining the distance between h1 and h2. Reference herein to the length can be reference to at least one of Lmiddle or Lp.

It will be appreciated that the above characteristics can be attributed to a batch of shaped abrasive particles, which may be a group of shaped abrasive particles made through the same forming process. In another instance, a batch of shaped abrasive particles can be a group of shaped abrasive particles made by the same forming process and under substantially the same conditions using the same forming process. In yet another instance, a batch of shaped abrasive particles can be a group of shaped abrasive particles of an abrasive article, such as a fixed abrasive article, and more particularly a coated abrasive article, which may be independent of a particular forming method.

Moreover, reference herein to any dimensional characteristic (e.g., h1, h2, hi, w, Lmiddle, Lp, and the like) can be reference to a dimension of a single particle, a median value, or an average value derived from analysis of a suitable sampling of particles from a batch. Unless stated explicitly, reference herein to a dimensional characteristic can be considered reference to a median value that is based on a statistically significant value derived from a random sampling of suitable number of particles of a batch. Notably, for certain embodiments herein, the sample size can include at least 10, and more typically, at least 40 randomly selected particles from a batch of particles. A batch of particles may include, but need not necessarily be limited to, a group of particles that are collected from a single process run. In yet another instance, a batch of shaped abrasive particles can be a group of shaped abrasive particles of an abrasive article, such as a fixed abrasive article, and more particularly, a coated abrasive article, which may be independent of a particular forming method, but having one or more defining features present in a particular population of the particles. For example, a batch of particles may include an amount of shaped abrasive particles suitable for forming a commercial grade abrasive product, such as at least about 20 lbs. of particles.

In accordance with an embodiment, the body 1601 of the shaped abrasive particle can have a first corner height (hc) at a first region of the body defined by a corner 1613. Notably, the corner 1613 may be the point of greatest height on the body 1601. However, in other instances, the height at the corner 1613 does not necessarily represent the point of greatest height on the body 1601. The corner 1613 can be defined as a point or region on the body 1601 defined by the joining of the upper surface 1603 and two side surfaces 1605 and 1607. The body 1601 may further include other corners, spaced apart from each other, including for example, corner 1611 and corner 1612. As further illustrated, the body 1601 can include edges 1614, 1615, and 1616 that can separated from each other by the corners 1611, 1612, and 1613. The edge 1614 can be defined by an intersection of the upper surface 1603 with the side surface 1606. The edge 1615 can be defined by an intersection of the upper surface 1603 and side surface 1605 between corners 1611 and 1613. The edge 1616 can be defined by an intersection of the upper surface 1603 and side surface 1607 between corners 1612 and 1613.

As further illustrated, the body 1601 can include a second midpoint height (hm) at a second end of the body, which can be defined by a region at the midpoint of the edge 1614, which can be opposite the first end defined by the corner 1613. The axis 1650 can extend between the two ends of the body 1601. FIG. 16B is a cross-sectional illustration of the body 1601 along the axis 1650, which can extend through a midpoint 1681 of the body along the dimension of length (Lmiddle) between the corner 1613 and the midpoint of the edge 1614.

In certain instances, the body of the shaped abrasive particle may have alternative features as compared to certain features described herein. For example, in one embodiment, the body can have an interior height that is less than the height of the body at the corners. In one particular embodiment, the body can have an average difference in height of at least about 5 microns, such as at least about 10 microns, or even at least about 20 microns. The average difference in height can be the absolute value of [hc−hm] between a first corner height (hc) and a second midpoint height (hm). It will be appreciated that average difference in height may be calculated as hm-hc when the height of the body 301 at a midpoint of the edge is greater than the height at an opposite corner. In other instances, the average difference in height [hc−hm], can be at least about 25 microns, at least about 60 microns, or even at least about 100 microns. In one non-limiting embodiment, the average difference in height can be not greater than about 300 microns, not greater than about 180 microns, or even not greater than about 80 microns. It will be appreciated that the average difference in height can be within a range between any of the minimum and maximum values noted above.

Moreover, the average difference in height can be based upon an average value of hc. For example, the average height of the body at the corners (Ahc) can be calculated by measuring the height of the body at all corners and averaging the values, and may be distinct from a single value of height at one corner (hc). Accordingly, the average difference in height may be calculated as the absolute value of the equation [Ahc−hi]. Furthermore, it will be appreciated that the average difference in height can be calculated using a median interior height (Mhi) calculated from a suitable sample size from a batch of shaped abrasive particles and an average height at the corners for all particles in the sample size. Accordingly, the average difference in height may be given by the absolute value of the equation [Ahc−Mhi]. The heights hc and hm of the particles can be measured using a STIL (Sciences et Techniques Industrielles de la Lumiere—France) Micro Measure 3D Surface Profilometer (white light (LED) chromatic aberration technique) and the average difference in height can be calculated based on the average values of hc and hm from the sample.

In one instance, the body can have an interior height (hi), which can be the smallest dimension of height of the body as measured along a dimension between any corner and opposite midpoint edge on the body. In particular instances wherein the body is a generally triangular (or truncated triangular) two-dimensional shape, the interior height (hi) may be the smallest dimension of height (i.e., measure between the bottom surface 1604 and the upper surface 1603) of the body for three measurements taken between each of the three corners and the opposite midpoint edges. The interior height (hi) of the body of a shaped abrasive particle is illustrated in FIG. 16B. According to one embodiment, the interior height (hi) can be at least about 28% of the width (w). The height (hi) of any particle may be measured by sectioning or mounting and grinding the shaped abrasive particle and viewing in a manner sufficient (e.g., light microscope or SEM) to determine the smallest height (hi) within the interior of the body 301. In one particular embodiment, the height (hi) can be at least about 29% of the width, such as at least about 30%, or even at least about 33% of the width of the body. For one non-limiting embodiment, the height (hi) of the body can be not greater than about 80% of the width, such as not greater than about 76%, not greater than about 73%, not greater than about 70%, not greater than about 68% of the width, not greater than about 56% of the width, not greater than about 48% of the width, or even not greater than about 40% of the width. It will be appreciated that the height (hi) of the body can be within a range between any of the above noted minimum and maximum percentages.

A batch of shaped abrasive particles, can be fabricated, wherein the median interior height value (Mhi) can be controlled, which may facilitate improved performance. In particular, the median internal height (hi) of a batch can be related to a median width of the shaped abrasive particles of the batch in the same manner as described above. Notably, the median interior height (Mhi) can be at least about 20%, such as at least about 22%, at least about 24%, or even at least about 26% of the median width of the shaped abrasive particles of the batch. For one non-limiting embodiment, the median interior height (Mhi) of the body can be not greater than about 80%, such as not greater than about 76%, not greater than about 70%, not greater than about 60%, not greater than about 50%, not greater than about 40%, not greater than about 38%, or even not greater than about 35% of the median width. It will be appreciated that the median interior height (Mhi) of the body can be within a range between any of the above noted minimum and maximum percentages.

Furthermore, the batch of shaped abrasive particles may exhibit improved dimensional uniformity as measured by the standard deviation of a dimensional characteristic from a suitable sample size. According to one embodiment, the shaped abrasive particles can have an interior height variation (Vhi), which can be calculated as the standard deviation of interior height (hi) for a suitable sample size of particles from a batch. The interior height variation can be not greater than about 60 microns, such as not greater than about 58 microns, not greater than about 56 microns, or even not greater than about 54 microns. In one non-limiting embodiment, the interior height variation (Vhi) can be at least about 2 microns. It will be appreciated that the interior height variation of the body can be within a range between any of the above noted minimum and maximum values.

For another embodiment, the body of the shaped abrasive particle can have an interior height (hi) of at least about 100 microns, such as at least about 200 microns. More particularly, the height may be at least about 250 microns, such as at least about 300 microns, or even at least about 400 microns. In still one non-limiting embodiment, the height of the body can be not greater than about 8 mm, such as not greater than about 5 mm, not greater than about 4 mm, not greater than about 3 mm, such as not greater than about 2 mm, not greater than about 1.5 mm, not greater than about 1 mm, not greater than about 800 microns, not greater than about 600 microns, or even not greater than about 400 microns. It will be appreciated that the height of the body can be within a range between any of the above noted minimum and maximum values. Moreover, it will be appreciated that the above range of values can be representative of a median interior height (Mhi) value for a batch of shaped abrasive particles.

For certain embodiments herein, the body of the shaped abrasive particle can have particular dimensions, including for example, a width≥length, a length≥height, and a width-≥height, and even more particularly, a width>length, a length>height, and a width>height. The body of the shaped abrasive particle can have a width (w) of at least about 600 microns, such as at least about 700 microns, at least about 800 microns, or even at least about 900 microns. In one non-limiting instance, the body can have a width of not greater than about 4 mm, such as not greater than about 3 mm, not greater than about 2.5 mm, or even not greater than about 2 mm. It will be appreciated that the width of the body can be within a range between any of the above noted minimum and maximum values. Moreover, it will be appreciated that the above range of values can be representative of a median width (Mw) for a batch of shaped abrasive particles.

The body of the shaped abrasive particle can have particular dimensions, including for example, a length (L middle or Lp) of at least about 0.4 mm, such as at least about 0.6 mm, at least about 0.8 mm, or even at least about 0.9 mm Still, for at least one non-limiting embodiment, the body can have a length of not greater than about 4 mm, such as not greater than about 3 mm, not greater than about 2.5 mm, or even not greater than about 2 mm. It will be appreciated that the length of the body can be within a range between any of the above noted minimum and maximum values. Moreover, it will be appreciated that the above range of values can be representative of a median length (Ml), which may be more particularly, a median middle length (MLmiddle) or median profile length (MLp) for a batch of shaped abrasive particles.

The shaped abrasive particle can have a body having a particular amount of dishing, wherein the dishing value (d) can be defined as a ratio between an average height of the body at the corners (Ahc) as compared to smallest dimension of height of the body at the interior (hi). The average height of the body at the corners (Ahc) can be calculated by measuring the height of the body at all corners and averaging the values, and may be distinct from a single value of height at one corner (hc). The average height of the body at the corners or at the interior can be measured using a STIL (Sciences et Techniques Industrielles de la Lumiere—France) Micro Measure 3D Surface Profilometer (white light (LED) chromatic aberration technique). Alternatively, the dishing may be based upon a median height of the particles at the corner (Mhc) calculated from a suitable sampling of particles from a batch. Likewise, the interior height (hi) can be a median interior height (Mhi) derived from a suitable sampling of shaped abrasive particles from a batch. According to one embodiment, the dishing value (d) can be not greater than about 2, such as not greater than about 1.9, not greater than about 1.8, not greater than about 1.7, not greater than about 1.6, not greater than about 1.5, not greater than about 1.3, not greater than about 1.2, not greater than about 1.14, or even not greater than about 1.10. Still, in at least one non-limiting embodiment, the dishing value (d) can be at least about 0.9, such as at least about 1.0, or even at least about 1.01. It will be appreciated that the dishing ratio can be within a range between any of the minimum and maximum values noted above. Moreover, it will be appreciated that the above dishing values can be representative of a median dishing value (Md) for a batch of shaped abrasive particles.

The shaped abrasive particles of the embodiments herein, including for example, the body 1601 of the particle of FIG. 16A can have a bottom surface 1604 defining a bottom area (Ab). In particular instances the bottom surface 1604 can be the largest surface of the body 1601. The bottom surface can have a surface area defined as the bottom area (Ab) that is greater than the surface area of the upper surface 1603. Additionally, the body 1601 can have a cross-sectional midpoint area (Am) defining an area of a plane perpendicular to the bottom area and extending through a midpoint 1681 of the particle. In certain instances, the body 1601 can have an area ratio of bottom area to midpoint area (Ab/Am) of not greater than about 6. In more particular instances, the area ratio can be not greater than about 5.5, such as not greater than about 5, not greater than about 4.5, not greater than about 4, not greater than about 3.5, or even not greater than about 3. Still, in one non-limiting embodiment, the area ratio may be at least about 1.1, such as at least about 1.3, or even at least about 1.8. It will be appreciated that the area ratio can be within a range between any of the minimum and maximum values noted above. Moreover, it will be appreciated that the above area ratios can be representative of a median area ratio for a batch of shaped abrasive particles.

Figure 16C:
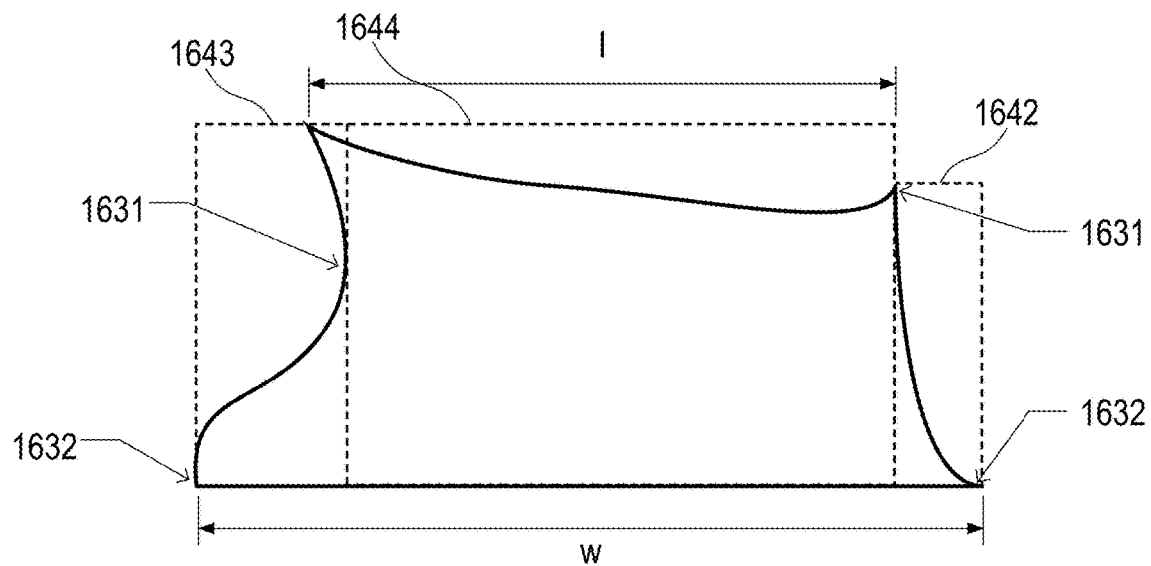
FIG. 16C includes a side-view of the shaped abrasive particle of FIG. 16A.

The shaped abrasive particles of the embodiments herein can have a percent flashing that may facilitate improved performance Notably, the flashing can define an area of the particle as viewed along one side, such as illustrated in FIG. 16C, wherein the flashing extends from a side surface of the body within the boxes 1642 and 1643. The flashing can represent tapered regions proximate to the upper surface and bottom surface of the body. The flashing can be measured as the percentage of area of the body along the side surface contained within a box extending between an innermost point of the side surface (e.g., 1631) and an outermost point (e.g., 1632) on the side surface of the body. In one particular instance, the body can have a particular content of flashing, which can be the percentage of area of the body contained within the boxes 1642 and 1643 compared to the total area of the body contained within boxes 1642, 1643, and 1644. According to one embodiment, the percent flashing (f) of the body can be not greater than about 45%, such as not greater than about 40%, not greater than about 36%, not greater than about 30%, not greater than about 20%, not greater than about 16%, not greater than about 14%, not greater than about 12%, or even not greater than about 10%. In still another embodiment, the percent flashing of the body can be at least about 5%, such as at least about 5.5%, at least about 6%, at least about 6.5%, at least about 7%, or even at least about 7.5%. It will be appreciated that the percent flashing of the body can be within a range between any of the above minimum and maximum percentages. Moreover, it will be appreciated that the above flashing percentages can be representative of an average percentage flashing or a median percentage flashing for a batch of shaped abrasive particles.

The percent flashing can be measured by mounting the shaped abrasive particle on its side and viewing the body at the side to generate a black and white image, such as illustrated in FIG. 16C. A suitable program for such includes ImageJ software. The percentage flashing can be calculated by determining the area of the body 1641 in the boxes 1642 and 1643 compared to the total area of the body as viewed at the side, including the area in the center 1644 and within the boxes. Such a procedure can be completed for a suitable sampling of particles to generate average, median, and/or and standard deviation values.

A batch of shaped abrasive particles according to embodiments herein may exhibit improved dimensional uniformity as measured by the standard deviation of a dimensional characteristic from a suitable sample size. According to one embodiment, the shaped abrasive particles can have a flashing variation (Vf), which can be calculated as the standard deviation of flashing percentage (f) for a suitable sample size of particles from a batch. According to one embodiment, the flashing variation can be not greater than about 5.5%, such as not greater than about 5.3%, not greater than about 5%, or not greater than about 4.8%, not greater than about 4.6%, or even not greater than about 4.4%. In one non-limiting embodiment, the flashing variation (Vf) can be at least about 0.1%. It will be appreciated that the flashing variation can be within a range between any of the minimum and maximum percentages noted above.

The shaped abrasive particles of the embodiments herein can have a height (hi) and flashing multiplier value (hiF) of at least 4000, wherein hiF=(hi)(f), an "hi" represents a minimum interior height of the body as described above and "f" represents the percent flashing. In one particular instance, the height and flashing multiplier value (hiF) of the body can be greater, such as at least about 2000 micron %, at least about 2500 micron %, at least about 2800 micron %, at least about 3000 micron %, or even at least about 3200 micron %. Still, in one non-limiting embodiment, the height and flashing multiplier value can be not greater than about 45000 micron %, such as not greater than about 20000 micron %, not greater than about 10000 micron %, not greater than about 8000 micron %, or even not greater than about 5000 micron %. It will be appreciated that the height and flashing multiplier value of the body can be within a range between any of the above minimum and maximum values. Moreover, it will be appreciated that the above multiplier value can be representative of a median multiplier value (MhiF) for a batch of shaped abrasive particles.

The shaped abrasive particles of the embodiments herein can have a dishing (d) and flashing (F) multiplier value (dF) as calculated by the equation dF=(d)(F), wherein dF is not greater than about 90%, wherein "d" represents the dishing value, and "f" represents the percentage flashing of the body. In one particular instance, the dishing (d) and flashing (F) multiplier value (dF) of the body can be not greater than about 70%, such as not greater than about 60%, not greater than about 50%, not greater than about 30%, not greater than about 20%, or even not greater than about 10%. Still, in one non-limiting embodiment, the dishing (d) and flashing (F)

multiplier value (dF) can be at least about 4.5%, such as at least about 6%, at least about 7%, at least about 7.5%, or even at least about 8%. It will be appreciated that the dishing (d) and flashing (F) multiplier value (dF) of the body can be within a range between any of the above minimum and maximum values. Moreover, it will be appreciated that the above multiplier value can be representative of a median multiplier value (MdF) for a batch of shaped abrasive particles.

The shaped abrasive particles of the embodiments herein can have a height and dishing ratio (hi/d) as calculated by the equation hi/d=(hi)/(d), wherein hi/d is not greater than about 1000, and "hi" represents a minimum interior height as described above, and "d" represents the dishing of the body. In one particular instance, the ratio (hi/d) of the body can be not greater than about 900 microns, not greater than about 800 microns, not greater than about 700 microns, or even not greater than about 650 microns. Still, in one non-limiting embodiment, the ratio (hi/d), can be at least about 10 microns, such as at least about 100 microns, at least about 200 microns, at least about 250 microns, at least about 300 microns, at least about 350 microns, or even at least about 375 microns. It will be appreciated that the ratio (hi/d) of the body can be within a range between any of the above minimum and maximum values. Moreover, it will be appreciated that the above height and dishing ratio can be representative of a median height and dishing ratio (Mhi/d) for a batch of shaped abrasive particles.

The shaped abrasive particles of the embodiments herein can have a side ratio, which can be defined by [(w−l)/hi], wherein "w" is the width or greatest dimension of the side of the particle as viewed from the side, "l" represents the length of the particle along an opposite major surface of the particle from the width as viewed from the side, and "hi" represents the interior height as described herein. In particular instances, "l" may be the profile length. According to one embodiment, the side ratio can be at least about 0.45, such as at least about 0.5, at least about 0.55, or even at least about 0.6. Still, in one non-limiting embodiment, the side ratio can be not greater than about 0.99, such as not greater than about 0.95, not greater than about 0.9, or even not greater than about 0.88. It will be appreciated that the side ratio of the body can be within a range between any of the above minimum and maximum values. Moreover, it will be appreciated that the above side ratio can be a median value, derived from median dimension values of width, length, and interior height for a batch of shaped abrasive particles.

According to another embodiment, the body can have a particular rake angle, which may be defined as an angle between the bottom surface 304 and a side surface 305, 306 or 307 of the body. For example, the rake angle may be within a range between about 1° and about 100°. For other particles herein, the rake angle can be within a range between about 5° and 100°, such as between about 10° and about 100°, between about 15° and 100°, or even between about 20° and 93°. Formation of an abrasive particle having such a rake angle can improve the abrading capabilities of the abrasive particle. Notably, the rake angle can be within a range between any two rake angles noted above.

The shaped abrasive particle can be formed such that the body includes a crystalline material, and more particularly, a polycrystalline material. Notably, the polycrystalline material can include abrasive grains. In one embodiment, the body can be essentially free of an organic material, including for example, a binder. More particularly, the body can consist essentially of a polycrystalline material.

In one aspect, the body of the shaped abrasive particle can be an agglomerate including a plurality of abrasive particles, grit, and/or grains bonded to each other to form the body of the abrasive particle. Suitable abrasive grains can include nitrides, oxides, carbides, borides, oxynitrides, oxyborides, diamond, and a combination thereof. In particular instances, the abrasive grains can include an oxide compound or complex, such as aluminum oxide, zirconium oxide, titanium oxide, yttrium oxide, chromium oxide, strontium oxide, silicon oxide, and a combination thereof. In one particular instance, the abrasive particle is formed such that the abrasive grains forming the body 101 include alumina, and more particularly, may consist essentially of alumina.

The abrasive grains (i.e., crystallites) contained within the body may have an average grain size that is generally not greater than about 100 microns. In other embodiments, the average grain size can be less, such as not greater than about 80 microns, not greater than about 50 microns, not greater than about 30 microns, not greater than about 20 microns, not greater than about 10 microns, or even not greater than about 1 micron. Still, the average grain size of the abrasive grains contained within the body can be at least about 0.01 microns, such as at least about 0.05 microns, such as at least about 0.08 microns, at least about 0.1 microns, or even at least about 1 micron. It will be appreciated that the abrasive grains can have an average grain size within a range between any of the minimum and maximum values noted above.

In accordance with certain embodiments, the abrasive particle can be a composite article including at least two different types of abrasive grains within the body. It will be appreciated that different types of abrasive grains are abrasive grains having different compositions with regard to each other. For example, the body can be formed such that is includes at least two different types of abrasive grains, wherein the two different types of abrasive grains can be nitrides, oxides, carbides, borides, oxynitrides, oxyborides, diamond, and a combination thereof.

In accordance with an embodiment, the abrasive particle can have an average particle size, as measured by the largest dimension measurable on the body, of at least about 100 microns. In fact, the abrasive particle can have an average particle size of at least about 150 microns, such as at least about 200 microns, at least about 300 microns, at least about 400 microns, at least about 500 microns, at least about 600 microns, at least about 700 microns, at least about 800 microns, or even at least about 900 microns. Still, the abrasive particle can have an average particle size that is not greater than about 5 mm, such as not greater than about 3 mm, not greater than about 2 mm, or even not greater than about 1.5 mm. It will be appreciated that the abrasive particle can have an average particle size within a range between any of the minimum and maximum values noted above.

Figure 17A:
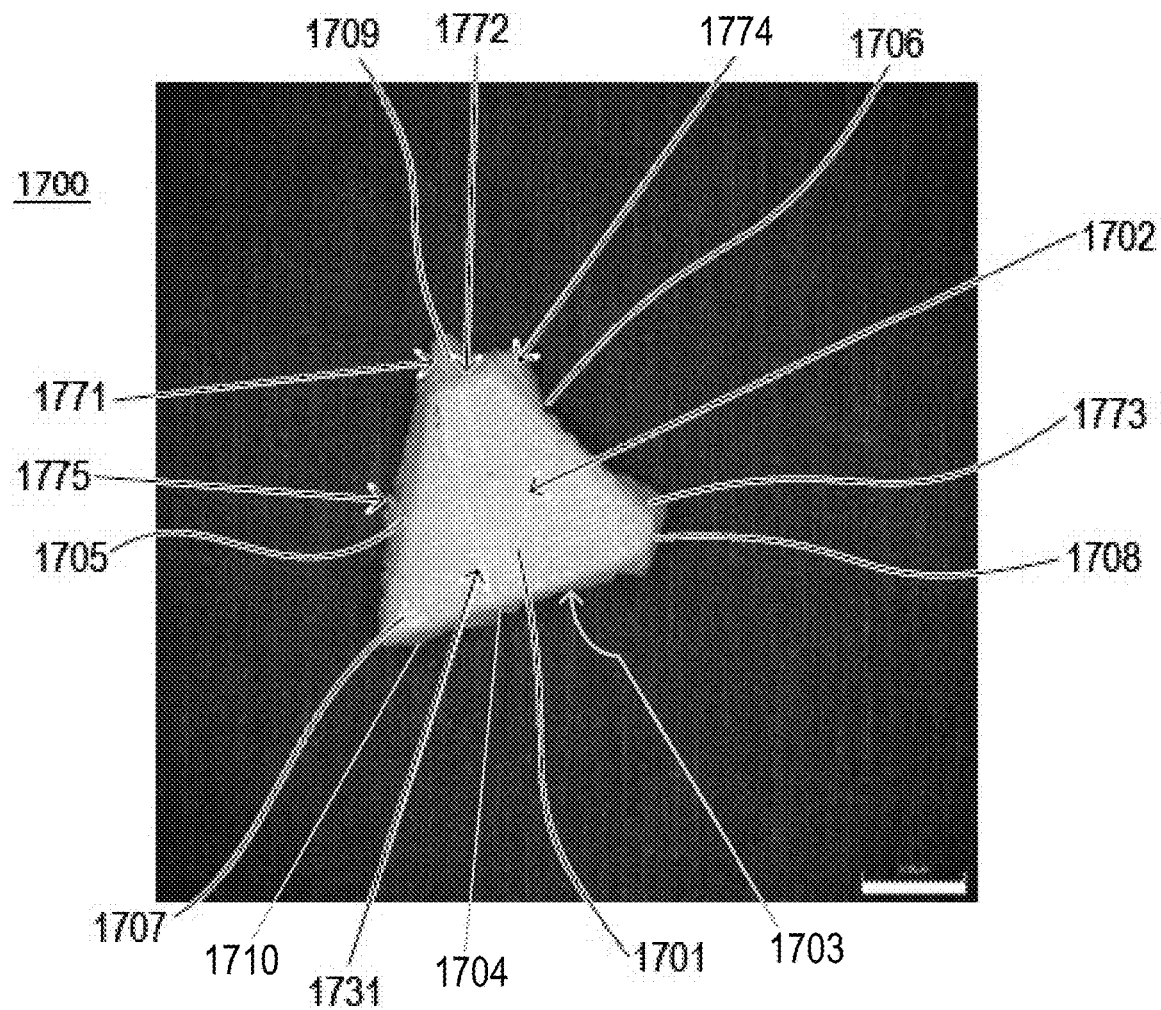
FIG. 17A includes a top-view image of a shaped abrasive particle according to an embodiment.
Figure 17B:
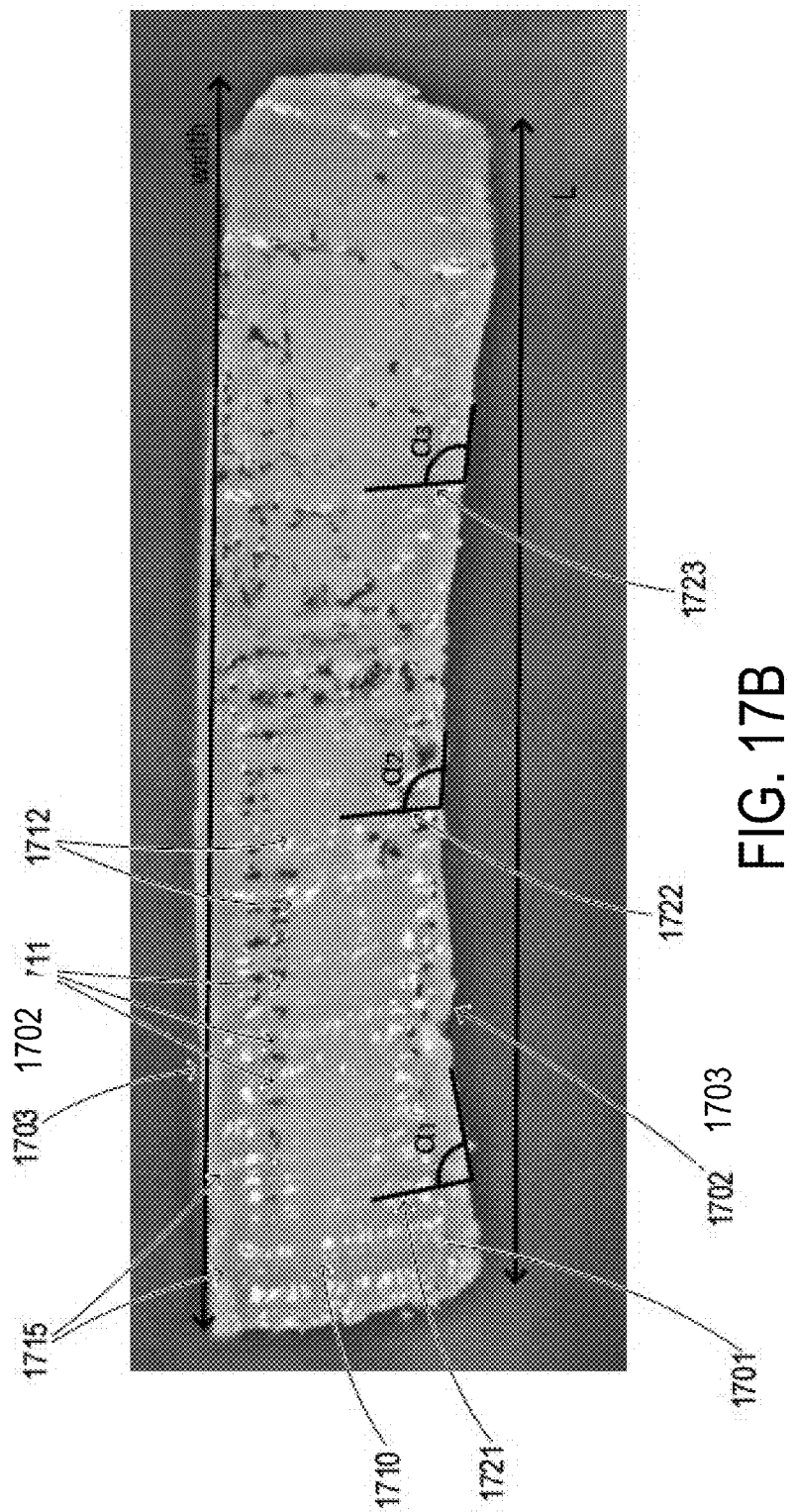
FIG. 17B includes a side-view image of the shaped abrasive particle of FIG. 17A.
Figure 17C:
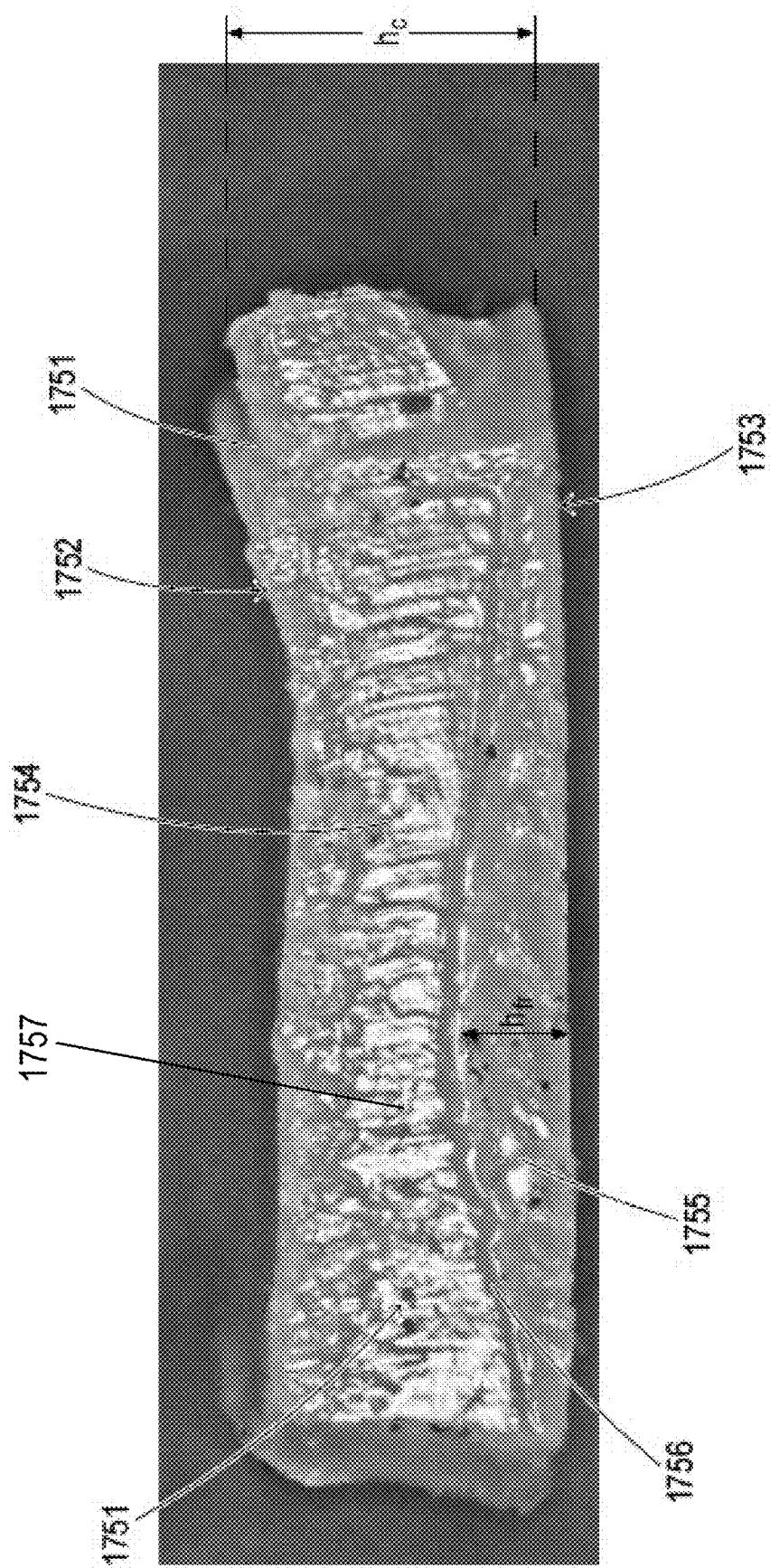
FIG. 17C includes a side-view image of a shaped abrasive particle according to an embodiment.
Figure 18A:
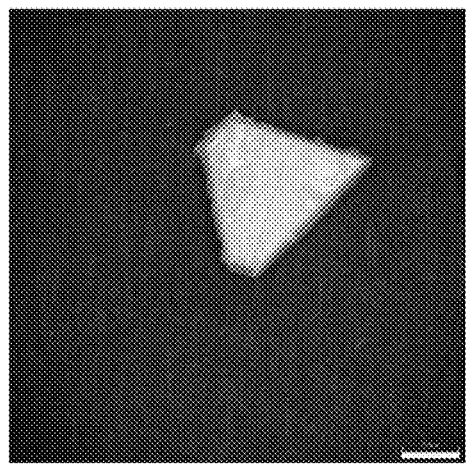
FIG. 18A-18E include top-view images of shaped abrasive particles according to an embodiment.
Figure 18B:
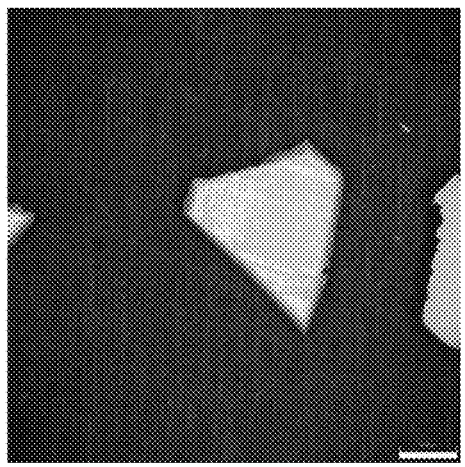
Figure 18C:
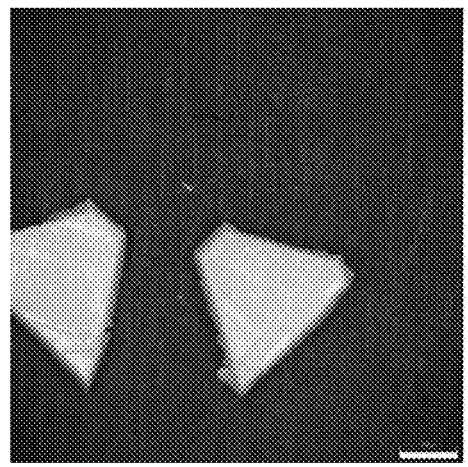
Figure 18D:
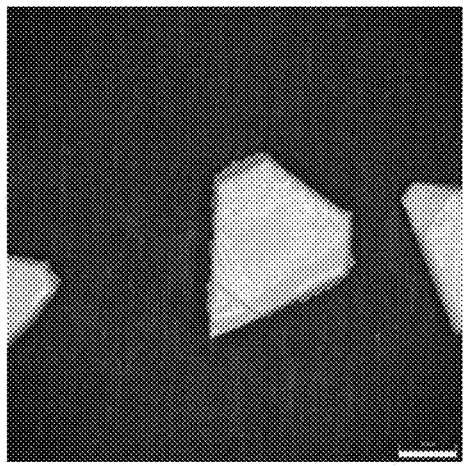
Figure 18E:
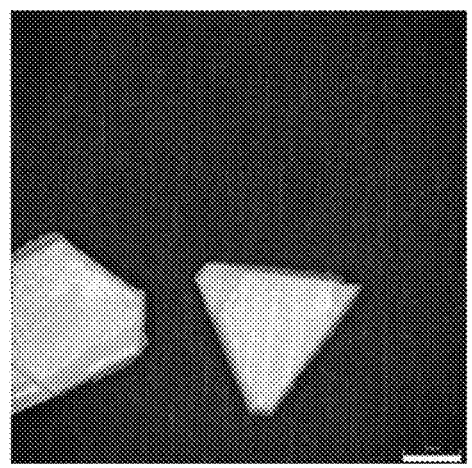
Figure 19A:
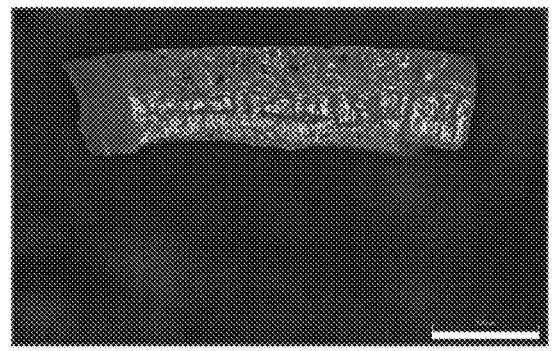
FIG. 19A-19E include side-view images of shaped abrasive particles according to an embodiment.
Figure 19B:
Figure 19C:
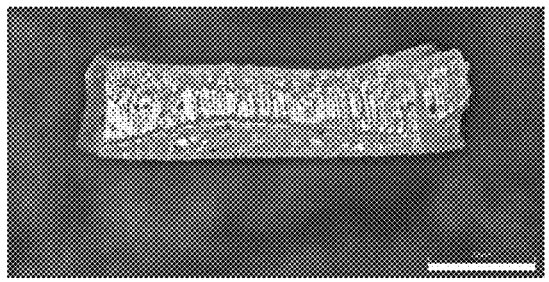
Figure 19D:
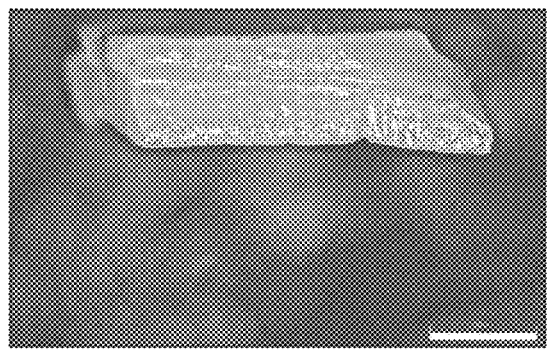
Figure 19E:
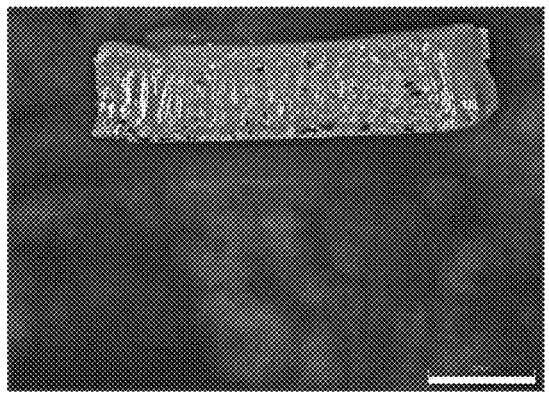

FIG. 17A includes a top-down image of a shaped abrasive particle formed according to an embodiment. FIG. 17B includes a side-view image of the shaped abrasive particle of FIG. 17A. FIG. 17C includes an image of a side-view of a shaped abrasive particle according to an embodiment. As depicted, the shaped abrasive particle 1700 can have a body 1701 including a first major surface (i.e., upper surface) 1702, a second major surface (i.e., bottom surface) 1703, and side surfaces 1704, 1705, and 1706 extending between the first and second major surfaces 1701 and 702. As further shown, the shaped abrasive particle comprises a corner-truncated two-dimensional shape as viewed top down in the plane defined by the length and width of the body 1701. In particular, the body 1701 is a multiple corner-truncated triangular shape having a first triangular corner 1707, a truncated corner 1708, and a partially truncated corner 1709. A corner truncated shape can include shapes wherein at least a portion of the feature of a corner is missing or altered in shape, such as the partially truncated corner 1709 of the body 1701.

As further shown in FIG. 17A, the partially truncated corner 1709 can include a bottom portion 1771 and an upper portion 1772, which can be distinct from each other in location and shape. As shown, the bottom portion 1771 can extend from the bottom surface 1703 of the body 1701. In particular, the bottom portion 1771 can extend vertically in the direction of the height of the body for a fraction of the height of the body, such that an upper surface of the bottom portion 1771 is spaced apart from the upper surface 1702 of the body 1701 by the upper portion 1772. The bottom portion 1771 can have a shape approximating the shape of the corner that may have been formed prior to partial truncation. For example, as shown, the bottom portion 1771 can have a shape as viewed top down that is substantially the same as the shape of corner 1707, which is representative of a non-truncated corner for the body 1701.

The upper portion 1772 can include a substantially flat surface extending between the side surfaces 1706 and 1705. The upper portion can be abutting the upper surface 1702, and more particularly, intersecting an edge defining a perimeter of the upper surface 1702. The upper portion 1772 can have a height extending vertically in the direction of the height of the particle for a fraction of the total height of the particle. The upper portion 1772 can extend downward from the upper surface 1702 toward the bottom surface 1703 of the body and abutting the bottom portion 1771 at a point along the corner 1709 between the upper surface 1702 and bottom surface 1703.

The corner 1708 of the body can include a completely truncated corner, wherein the entire corner 1708 is defined by a single, substantially flat surface extending between the upper surface 1702 and the bottom surface 1703 of the body.

As further shown in FIG. 17A, the body 1701 can include fractured regions 1773, 1774, and 1775. The fractured regions 1773, 1774, and 1775, may be linked to one or more aspects of the forming process, including but not limited to, sectioning of the sheet and fracture of the gel between precursor shaped abrasive particles after sectioning or partial sectioning. The fractured regions 1773 and 1774 can be preferentially located at or near the corners 1708 and 1709, respectively. In particular, the fractured region 1773 can be abutting the truncated corner 1708, and even more particularly, the fracture region 1773 can define a portion of the body 1701 extending from the bottom surface 1703 around the entire periphery of the truncated corner 1708 from side surface 1706 to side surface 1704. The fractured region 1774 can be preferentially located at the corner 1709, and particularly may extend for a distance from the corner 1709 down the width of the side surface 1706 toward the corner 1708. The fractured region 1774 can extend from the bottom surface 1703 and extend vertically for a fraction of the entire height of the side surface 1706.

The fractured region 1775 can extend along the side surface 1705. The fractured region 1775 can define a serrated edge comprising protrusions and grooves. In particular locations, the fractured region 1775 can define irregularly shaped protrusions and irregular shaped grooves extending from the bottom surface 1703. In certain instances, the serrated edge can have the appearance of a saw blade edge. Moreover, the fractured region 1775 can have a height extending for a fraction of the height of the side surface 1705.

In certain instances, at least a portion of the fractured surface 1775 can define irregular scalloped edge. The irregular scalloped edge can have substantially arcuate-shaped grooves separated by ridges. Moreover, the irregular scalloped edge can flow downward from the upper surface 1703 along the side surface 1705 and extend outward from the side surface 1705 away from the body 1701.

The shaped abrasive particle 1700 can have a ripple feature 1710 extending along at least a portion of the side surface of the body 1701. The ripple feature 1710 may be a result of one or more aspects of the forming process. As shown in FIG. 17B, the ripple feature 1710 can define a plurality of grooves 1711 extending along at least a portion of a side surface of the body 1701. Moreover, the ripple feature 1710 can define a plurality of grooves 1711 separated by ridges 1712, wherein the ridges 1712 can define raised regions between the grooves 1711. In certain instances, the grooves 1711 can have an average width greater than an average width of the ridges 1712. In still other instances, the grooves 1711 can have an average width less than an average width of the ridges 1712. As further shown, in certain instances, the grooves 1711 can have rounded ends 1715 for at least one end proximate to one of the major surfaces of the body 1701. Moreover, the ripple feature can include a plurality of grooves 1711 and ridges 1712, wherein the width of the grooves extending in the direction of the width of the side surface can be significantly less than the width of the side surface.

According to a particular embodiment, at least one ridge can extend along the side surface of the body 1701 in a direction defined by a longitudinal axis that defines an angle within a range between about 10 degrees and about 170 degrees relative to the first major surface 1702. Referring to FIG. 17B, the longitudinal axes of three ridges 1721, 1722, and 1723 are illustrated. Moreover, each of the longitudinal axes 1721-1723 form a particular angle α1, α2, and α3 with respect to the upper surface 1702, when the shaped abrasive particle is analyzed using a light microscope and mounted on its side as shown in FIG. 17B. In certain other embodiments, the angle can be within a range between about 30 degrees and about 150 degrees, such as within a range between about 60 degrees and about 140 degrees, or even within a range between about 70 degrees and about 120 degrees. Moreover, as illustrated in FIG. 17B, a majority of the ridges defining the ripple feature 1710 can have a longitudinal axis extending at an angle within a range between about 10 degrees and about 170 degrees relative to the first major surface 1702.

According to embodiments herein, the ripple feature 1710 can extend along a majority of a width of the body 1701 on the side surface. For example, the ripple feature 1710 can extend for at least about 70%, such as at least about 80%, or even at least about 90% of the width of the body of a side surface. In still another, non-limiting embodiment, the ripple feature 1710 can extend for essentially the entire width of the body 1701 along at least one side surface.

Moreover, the ripple feature 1710 may be present on more than one side surface of the body 1701. For example, the ripple feature 1710 can extend along a majority of the external surface area the side surfaces of the body 1701. More particularly, the ripple feature 1710 can extend along substantially all side surfaces of the body 1701.

The ripple feature may have a particular height relative to the height of the body 1701. For example, the ripple feature

1710 may have a height, as defined by the longest dimension or the ripple feature in a direction parallel to the greatest height dimension (e.g., hc) of the body 1701, which can be at least a portion (e.g., a minority) of the height of the body 1701 on at least one side surface. According to one embodiment, the ripple feature can extend for at least about 10%, such as at least about 20%, at least about 30%, or even at least about 40% of the height of the body 1701. In more particular instances, the ripple feature 1710 can extend for a majority of a height of the body 1701 on at least one side surface, including for example, at least about 50%, such as at least about 60%, at least about 70%, at least about 80%, or even at least about 90% of the height of the body. In certain instances, the ripple feature 1710 can extend for essentially the entire height of at least one side surface of the body 1701.

According to another aspect, the ripple feature 1710 can extend for at least a portion of a height of the body on a majority of side surfaces of the body 1701. In certain embodiments, the ripple feature 1710 can extend for at least a portion of a height of the body 1701 on each of the side surfaces of the body 1701.

The side surface comprising the ripple feature can have a surface roughness greater than a surface roughness of the first major surface 1702 or second major surface 1703 of the body 1701. In particular, as illustrated in views of FIGS. 17A and 17B, the side surface having the ripple feature 1710 can have a surface roughness greater than a surface roughness of an upper surface 1702 of the body 1701, wherein the upper surface 1702 of the body 1701 has striations 1731. The striations 1731 may be smoothing lines, which were initially made in an upper surface of the sheet 111 during forming, for example, via a doctor blade, which can be imparted to the shaped abrasive particles.

In certain instances, the ripple feature 1710 can intersect an edge defining a first major surface 1702 of the body 1701. More particularly, a majority of the ripple feature 1710 along the side surface of the body 1701 can intersect an upper surface 1702 of the body 1701. Still, more particularly, essentially the entire ripple feature 1710 can intersects an edge defining an upper surface 1702 of the body 1701. Moreover, at least a portion of the ripple feature 1710 can be spaced apart from a non-intersecting a bottom surface 1703 of the body 1701.

FIG. 17C includes a side-view image of a shaped abrasive particle formed according to an embodiment. As shown, the body 1751 of the shaped abrasive particle has a side surface 1757, and at least a portion of the side surface 1757 includes a fractured region 1755. The fractured region 1755 can be distinct from the ripple feature 1754, which can be characterized by grooves and ridges extending in a particular manner relative to the major surface 1752. The fracture region 1755 can be distinct from the ripple feature 1754 in its placement, orientation, and appearance on the side surface 1757. For example, the fractured region 1755 can intersect an edge defining the second major surface (i.e., bottom surface) 1753 of the body 1751. In particular instances, a majority of the fractured region can intersect the bottom surface 1753 of the body 1751. Even more particularly, in some shaped abrasive particles, essentially the entirety of the fractured region 1755 can intersect a bottom surface 1753 of the body 1701.

The fractured region 1755 can have a surface roughness that is greater than a surface roughness of the first major surface 1752 or second major surface 1753 of the body 1701. In particular instances, the fractured region 1755 can define a region having a surface roughness greater than a surface roughness of an upper surface 1752 of the body 1701 or bottom surface 1753 of the body 1751. Moreover, the fractured region 1755 can define a region having a surface roughness greater than a surface roughness of a side surface spaced apart from the fracture region, and more particularly, a surface roughness greater than a surface roughness of the side surface including a ripple feature 1754.

As further illustrated, for shaped abrasive particles having a ripple feature 1754 and a fractured region 1755 on the same side surface 1757, the ripple feature 1754 and fractured region 1755 can be separated by a boundary 1756, which may be a region characterized by a substantially smooth surface. Moreover, in such particles, the fractured region 1755 can be abutting the edge of the body 1751 defining the bottom surface 1753 while the ripple feature 1754 can be abutting an edge of the body 1751 defining the upper surface 1752.

According to one embodiment, for certain shaped abrasive particles, the fractured region 1755 may extend for a minority of a width of the body on the side surface. In still other embodiments, the fractured region 1755 can extend along a majority of a width of the body on the side surface. Even more particularly, for certain shaped abrasive particles, the fractured region 1755 can extend for at least about 70%, such as at least about 80%, or even at least about 90% of the width of the body on a side surface. In certain instances, the fractured region can extend for essentially the entire width of the body along the entire side surface.

For certain shaped abrasive particles, the fractured region can extend along a minority of the external surface area of all side surfaces of the body. Still, for another aspect, the fractured region may extend along a majority of all side surfaces of the body. And in yet other instances, the fractured region can extend along essentially all of the side surfaces of the body.

Moreover, the fractured region 1755 can have a height (hfr) that is at least a portion of the greatest height (e.g., hc) of the body on at least one side surface. The height of the fracture region (hfr) can be the greatest dimension in the direction parallel to the height of the body 1751. According to one embodiment, the fractured region 1755 can have a height (hfr) extending for a minority of a height of the body 1751 on at least one side surface 1757. In other instances, the fractured region can have a height (hfr) extending for a majority of a height of the body 1751 on at least one side surface 1757. It will be appreciated that such features may exist for any side surfaces of shaped abrasive particles according to embodiments herein. Moreover, such features may exist for one, a minority fraction, or even a majority of shaped abrasive particles of a batch according to embodiments herein.

Embodiments herein also include a batch of particulate material, which can include one or more shaped abrasive particles of the embodiments herein. Moreover, the batch of particulate material can include shaped abrasive particles having one or more features described herein. One or more features of the shaped abrasive particles described herein can be evident in the shaped abrasive particles of a batch. Moreover, the batch may be characterized by the existence and variance of the one or more features.

According to one aspect, a batch of particulate material can include a first portion including a first type of shaped abrasive particle and a second portion including a second type of shaped abrasive particle. The content of the first portion and second portion within the batch may be controlled at least in part based upon certain processing parameters. The first portion may include a plurality of shaped abrasive particles, wherein each of the particles of the first portion can have substantially the same two-dimensional shape.

The batch may include various contents of the first portion. For example, the first portion may be present in a minority amount or majority amount. In particular instances, the first portion may be present in an amount of at least about 1%, such as at least about 5%, at least about 10%, at least about 20%, at least about 30%, at least about 40%, at least about 50%, at least about 60%, at least about 70%, at least about 80%, or even at least about 90% for the total content of portions within the batch. Still, in another embodiment, the batch may include not greater than about 99%, such as not greater than about 90%, not greater than about 80%, not greater than about 70%, not greater than about 60%, not greater than about 50%, not greater than about 40%, not greater than about 30%, not greater than about 20%, not greater than about 10%, not greater than about 8%, not greater than about 6%, or even not greater than about 4% of the total portions within the batch. The batch can include a content of the first portion within a range between any of the minimum and maximum percentages noted above.

The second portion can include a plurality of shaped abrasive particles, wherein each of the shaped abrasive particles of the second portion can have substantially the same type of two-dimensional shape, but a distinct type of shape compared to the plurality of shaped abrasive particles of the first portion.

In certain instances, the batch may include a lesser content of the second portion relative to the first portion, and more particularly, may include a minority content of the second portion relative to the total content of particles in the batch. For example, the batch may contain a particular content of the second portion, including for example, not greater than about 40%, such as not greater than about 30%, not greater than about 20%, not greater than about 10%, not greater than about 8%, not greater than about 6%, or even not greater than about 4%. Still, in at least on non-limiting embodiment, the batch may contain at least about 0.5%, such as at least about 1%, at least about 2%, at least about 3%, at least about 4%, at least about 10%, at least about 15%, or even at least about 20% of the second portion for the total content of portions within the batch. It will be appreciated that the batch can contain a content of the second portion within a range between any of the minimum and maximum percentages noted above.

Still, in an alternative embodiment, the batch may include a greater content of the second portion relative to the first portion, and more particularly, can include a majority content of the second portion for the total content of particles in the batch. For example, in at least one embodiment, the batch may contain at least about 55%, such as at least about 60% of the second portion for the total portions of the batch.

In certain instances, the first type of shaped abrasive particle of the first portion can have a two-dimensional shape as viewed in a plane defined by a length (l) and a width (w) selected from the group of polygons, ellipsoids, numerals, Greek alphabet letters, Latin alphabet letters, Russian alphabet characters, complex shapes including a combination of polygonal shapes, and a combination thereof. For at least one particular embodiment, the first type of shaped abrasive particle of the first portion can be a triangular two-dimensional shape. The first portion may be, but need not be, essentially free of corner-truncated shapes.

The second portion can include a corner-truncated shape, including for example, a corner-truncated polygonal shape. In one particular embodiment, the second portion can include corner-truncated triangular shapes, and may consist essentially of corner-truncated triangular shapes. It will be appreciated that the batch can include other portions, including for example a third portion, comprising a plurality of shaped abrasive particles having a third type of two-dimensional shape that is different than the two-dimensional shape of the first type and second type of shaped abrasive particles. For example, in one particular embodiment, the batch can include a first portion comprising a plurality of shaped abrasive particles having a triangular two-dimensional shape, a second portion including a plurality of shaped abrasive particles having a single corner-truncated polygonal shape (e.g., a single corner-truncated triangular shape), and a third portion comprising a multiple (i.e., more than one) corner-truncated polygonal shape (e.g., corner-truncated triangular shapes having two or three corners truncated). Still, the second portion may include single corner-truncated shapes and multiple (i.e., more than one) corner-truncated shapes. For example, at least 10% of the second portion can include multiple corner-truncated triangle shapes having more than one truncated corner.

The batch may include various contents of the third portion relative to the second portion and first portion. The third portion may be present in a minority amount or majority amount. In particular instances, the third portion may be present in an amount of not greater than about 40%, such as not greater than about 30%, not greater than about 20%, not greater than about 10%, not greater than about 8%, not greater than about 6%, or even not greater than about 4% of the total portions within the batch. Still, in other embodiments the batch may include a minimum content of the third portion, such as at least about 1%, such as at least about 5%, at least about 10%, at least about 20%, at least about 30%, at least about 40%, or even at least about 50%. The batch can include a content of the third portion within a range between any of the minimum and maximum percentages noted above. Moreover, the batch may include a content of diluent, randomly shaped abrasive particles.

The batch may further include other features. For example, one or more shaped abrasive particles of the portions of the batch can have features of embodiments herein. In one instance, at least one shaped abrasive particle of the first portion can have a ripple feature on at least a portion of a side surface of the body of the particle. In other instances, a majority of shaped abrasive particles of the first portion can have a ripple feature on at least one side surface. In yet another aspect, essentially all of the shaped abrasive particles of the first portion can have a ripple feature on at least one side surface.

Moreover, at least one shaped abrasive particle of the second portion can include a ripple feature on at least a portion of a side surface. In yet another embodiment, a majority of shaped abrasive particles of the second portion can have a ripple feature on at least one side surface of each body. In still yet another aspect, essentially all of the shaped abrasive particles of the second portion may have a ripple feature on at least one side surface of each body.

Another aspect of the batch can be that at least one shaped abrasive particle of the first portion may have a fractured region on at least a portion of a side surface. For other embodiments, a majority of shaped abrasive particles of the first portion, including for example, essentially all of the shaped abrasive particles of the first portion, may have a fractured region on at least one side surface. Additionally or alternatively, at least one shaped abrasive particle of the second portion can include a fractured region on at least a portion of a side surface. More particularly, a majority of shaped abrasive particles of the second portion, and even essentially all of the shaped abrasive particles of the second portion, can include a fractured region on at least one side surface of each body.

At least one shaped abrasive particle of the first portion can have a side surface having a surface roughness greater than a surface roughness of a first major surface of the corresponding body. In still other instances, a majority of the shaped abrasive particles of the first portion, including essentially all of the shaped abrasive particles of the first portion, can have at least one side surface having a surface roughness greater than a surface roughness of the first major surface (e.g., an upper surface) for each of the corresponding bodies.

Likewise, at least one shaped abrasive particle of the second portion can have a side surface having a surface roughness greater than a surface roughness of a first major surface of the corresponding body. In one particular embodiment, a majority of the shaped abrasive particles of the second portion, including essentially all of the shaped abrasive particles of the second portion, can have at least one side surface having a surface roughness greater than a surface roughness of the first major surface for each of the corresponding bodies.

As will be appreciated, the batch can be part of a fixed abrasive article, including exemplary abrasive articles described herein. Moreover, according to certain embodiments, batch of particulate material may be incorporated into the fixed abrasive article in a predetermined orientation, wherein each of the shaped abrasive particles can have a predetermined orientation relative to each other and relative to a portion of the abrasive article (e.g., the backing of a coated abrasive).

EXAMPLES

A mixture in the form of a gel is obtained having approximately 52% solids loading of boehmite commercially available as Catapal B from Sasol Corp. combined with 48 wt % water containing a minority content of nitric acid and organic additives. The gel has a viscosity of approximately $8 \times 10^4$ Pa s and a storage modulus of $5 \times 10^5$ Pa, wherein viscosity is calculated by dividing the storage modulus value by 6.28 $s^{-1}$.

The gel is extruded from a die at approximately 80 psi (552 kPa) onto a translating belt having a film of polyester. The gel travels under a knife edge of the die to form a sheet having a height of approximately 1 mm Within 10 minutes of extruding, the sheet is sectioned using a blade at ambient atmospheric conditions, in air, and at a temperature of approximately 72° F. to form precursor shaped abrasive particles. The openings are maintained using an air knife directing air at the openings formed by the blade. The precursor shaped abrasive particles are dried for approximately 1-4 hours and fired at a temperature of approximately 1200° C.-1400° C. for 15 minute to 1 hour in air.

The shaped abrasive particles of Example 1 were formed and analyzed. FIGS. 17A and 17B include an image of a representative particle formed according to Example 1. FIGS. 18A-18E include images of other exemplary shaped abrasive particles formed according to Example 1. Moreover, FIGS. 19A-19E include images of the sides of the shaped abrasive particles of FIGS. 18A-18E, respectively. The batch of shaped abrasive particles have a median width of 1.53 mm, a median interior height of 451 microns, a median dishing ratio of 1.05 microns, a side ratio of 0.71, and a percent flashing of approximately 8%. Approximately 60% of the abrasive particles of the batch had at least one truncated corner, and a majority of the corner-truncated triangles were multiple corner-truncated shapes. Approximately 40% of the particles of the batch had at least one partially truncated corner. Furthermore, as demonstrated in the images, all of the shaped abrasive particles had at least one side surface having a ripple feature. Moreover, a significant portion of the shaped abrasive particles had at least one side surface having a fracture region. Moreover, a majority of shaped abrasive particles demonstrated at least one side surface having a fractured region defined by a serrated edge extending from the bottom surface and/or an irregular scalloped edge.

The present application represents a departure from the state of the art. While the industry has recognized that shaped abrasive particles may be formed through processes such as molding and screen printing, the processes of the embodiments herein are distinct from such processes. Notably, the embodiments herein utilize a combination of process features that facilitate the formation of shaped abrasive particles having one or a combination of unique features. Such features can include, but are not limited to, aspect ratio, composition, additives, two-dimensional shape, three-dimensional shape, difference in height, difference in height profile, flashing percentage, interior height, dishing, side ratio, fractured regions, ripple feature, and other aspects of the embodiments herein. Moreover, the processes of the embodiments herein facilitate the formation of a shaped abrasive particle or a batch of shaped abrasive particles, having one or more characteristics, including one or more combination of the features of the shaped abrasive particles. Certain shaped abrasive particles and batches containing shaped abrasive particles of the embodiments herein may have features that enable enhanced performance in the context of fixed abrasive articles. And in fact, and quite unexpectedly, such compositions may facilitate improved grinding performance in the context of fixed abrasives, such as bonded abrasives or coated abrasives.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A particulate material comprising:
   a shaped abrasive particle having a body comprising a first major surface, a second major surface, and a side surface extending between the first major surface and second major surface, wherein the side surface comprises a fractured region located on a portion of the side surface, wherein the fractured region is spaced apart from an edge defining the first major surface and abutting an edge defining the second major surface, and wherein the fractured region has a height ($h_{fr}$) that is less than a height of the body ($h_c$) on the side surface.

2. The particulate material of claim 1, further comprising a boundary on the side surface extending between the fractured region and the first major surface and further defining a region between the boundary and the first major surface having a distinct surface appearance from the fractured region.

3. The particulate material of claim 1, wherein a majority of the fractured region has a surface roughness that is greater than a surface roughness of the first major surface and the region between the boundary and the first major surface.

4. The particulate material of claim 1, wherein a majority of the fractured region has a surface roughness that is greater than a surface roughness of the second major surface and the region between the boundary and the first major surface.

5. The particulate material of claim 1, wherein the fractured region extends for a minority of a width of the body on the side surface.

6. The particulate material of claim 2, and wherein the region between the boundary and the first major surface comprises a ripple feature.

7. The particulate material of claim 1, wherein the fractured region defines a serrated edge.

8. The particulate material of claim 1, wherein the fractured region extends along a majority of the side surface of the body.

9. The particulate material of claim 1, wherein the fractured region has a height ($h_{fr}$) extending for a minority of the height of the body ($h_c$) on the side surface.

10. The particulate material of claim 1, wherein the fractured region has a height ($h_{fr}$) extending for a majority of a height of the body ($h_c$) on the side surface.

11. The particulate material of claim 1, wherein the body comprises a length (l), a width (w), and a height (h), wherein the width>length, length>height, and the width>height, and wherein the body comprises a primary aspect ratio defined by a ratio of width:length of at least about 1.2:1.

12. The particulate material of claim 1, wherein the body comprises a material selected from the group consisting of an oxide, a nitride, a carbide, a boride, an oxycarbide, oxynitride, and a combination thereof.

13. The particulate material of claim 1, wherein the particulate material is coupled to a substrate.

14. The particulate material of claim 13, wherein the substrate comprises a flexible material.

15. The particulate material of claim 1, wherein the body comprises a two-dimensional shape as viewed in a plane defined by a length (l) and a width (w) selected from the group consisting of polygons, ellipsoids, numerals, Greek alphabet letters, Latin alphabet letters, Russian alphabet characters, complex shapes including a combination of polygonal shapes, and a combination thereof.

16. The particulate material of claim 1, further comprising a fixed abrasive article containing the particulate material, wherein the particulate material is incorporated in the fixed abrasive article in a predetermined orientation.

17. The particulate material of claim 1, wherein the boundary has a substantially smooth surface.

18. The particulate material of claim 2, wherein the fractured region comprises a different surface roughness than the region between the boundary and the first major surface.

* * * * *